United States Patent
Kim

(10) Patent No.: US 11,200,494 B1
(45) Date of Patent: *Dec. 14, 2021

(54) METHOD FOR TRAINING AND TESTING OBFUSCATION NETWORK CAPABLE OF OBFUSCATING DATA FOR PRIVACY, AND TRAINING DEVICE AND TESTING DEVICE USING THE SAME

(71) Applicant: Deeping Source Inc., Seoul (KR)

(72) Inventor: Tae Hoon Kim, Seoul (KR)

(73) Assignee: Deeping Source Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/234,936

(22) Filed: Apr. 20, 2021

(30) Foreign Application Priority Data

Oct. 21, 2020 (KR) .................. 10-2020-0137123

(51) Int. Cl.
| | |
|---|---|
| *G06N 20/00* | (2019.01) |
| *G06F 21/62* | (2013.01) |
| *G06N 3/08* | (2006.01) |
| *G06N 3/04* | (2006.01) |

(52) U.S. Cl.
CPC ............ *G06N 3/08* (2013.01); *G06F 21/6254* (2013.01); *G06N 3/0454* (2013.01)

(58) Field of Classification Search
CPC ...... G06N 3/0454; G06N 3/0472; G06N 3/08; G06N 3/0445; G06N 3/088; G06N 7/005; G06T 2207/20081; G06T 2207/20021; G06F 21/6254

See application file for complete search history.

(56) References Cited

U.S. PATENT DOCUMENTS

| | | | |
|---|---|---|---|
| 10,140,544 B1 * | 11/2018 | Zhao | ............ G06T 7/143 |
| 10,621,378 B1 * | 4/2020 | Kim | ........... G06N 20/00 |
| 10,621,379 B1 * | 4/2020 | Kim | ........... G06N 20/00 |
| 10,713,794 B1 * | 7/2020 | He | ............ G06N 3/0454 |

(Continued)

OTHER PUBLICATIONS

Zhang et al, "Privacy-preserving machine learning through data obfuscation", Jul. 2018, arXiv preprint arXiv: 1807.01860. Jul. 5, 2018, pp. 1-12.*

(Continued)

*Primary Examiner* — Olujimi A Adesanya
(74) *Attorney, Agent, or Firm* — Husch Blackwell LLP

(57) ABSTRACT

A method of training an obfuscation network for obfuscating original data to protect personal information is provided. The method includes steps of a learning device, (a) inputting acquired training data into an obfuscation network to obfuscate the training data and inputting the obfuscated training data into an augmentation network to augment the obfuscated training data; (b) (i) inputting the augmented obfuscated training data into a learning network to generate first characteristic information and (ii) inputting the training data into the learning network to generate second characteristic information; and (c) training the obfuscation network such that (i) a first error, calculated by using the first and the second characteristic information, is minimized and (ii) a second error, calculated by using (ii-1) modified training data or modified obfuscated training data, and (ii-2) the obfuscated training data or the augmented obfuscated training data, is maximized.

26 Claims, 7 Drawing Sheets

(56) References Cited

U.S. PATENT DOCUMENTS

| | | | | |
|---|---|---|---|---|
| 11,017,319 | B1* | 5/2021 | Kim | G06N 20/00 |
| 11,017,320 | B1* | 5/2021 | Kim | G06N 3/0454 |
| 11,023,777 | B1* | 6/2021 | Koo | G06N 20/00 |
| 2019/0197670 | A1* | 6/2019 | Ferrer | G06K 9/00268 |
| 2019/0302290 | A1* | 10/2019 | Alwon | G01V 1/364 |
| 2021/0089845 | A1* | 3/2021 | Galeev | G06N 3/0454 |

OTHER PUBLICATIONS

Sun et al, "A hybrid model for identity obfuscation by face replacement", 2018, In Proceedings of the European Conference on Computer Vision (ECCV) 2018, pp. 1-17.*

* cited by examiner

METHOD FOR TRAINING AND TESTING OBFUSCATION NETWORK CAPABLE OF OBFUSCATING DATA FOR PRIVACY, AND TRAINING DEVICE AND TESTING DEVICE USING THE SAME

CROSS-REFERENCE TO RELATED APPLICATION

This application claims the benefit and priority of Korean Application No. KR 10-2020-0137123, filed on Oct. 21, 2020, the entire disclosure of which is incorporated herein by reference.

FIELD OF THE DISCLOSURE

The present disclosure relates to a method for training an obfuscation network capable of obfuscating, e.g., anonymizing or concealing, original data to protect personal information and a learning device using the same, and to a method for testing the trained obfuscation network capable of obfuscating the original data to protect the personal information and a testing device using the same.

BACKGROUND OF THE DISCLOSURE

Big data refers to data including all of unstructured data and semi-structured data not utilized so far, like e-commerce data, metadata, web log data, radio frequency identification (RFID) data, sensor network data, social network data, data of Internet text and documents, Internet search indexing data, as well as all of structured data used by conventional enterprises or public institutions. Data as such is referred to as the big data in the sense that common software tools and computer systems cannot easily handle such a huge volume of data.

And, although such a big data may have no meaning by itself, it can be useful for generation of new data, judgment, or prediction in various fields through machine learning on patterns and the like.

Recently, due to the strengthening of a personal information protection act, it is required to delete information, that can be used for identifying individuals, from the data or to acquire consent of the individuals in order to trade or share such a big data. However, it is not easy to check if any information that can be used for identifying the individuals is present in such a large amount of the big data, and it is impossible to obtain the consent of every individual. Therefore, various techniques for such purposes have emerged.

As an example of a related prior art, a technique is disclosed in Korean Patent Registration No. 1861520. According to this technique, a face-concealing method, e.g., a face-anonymizing method, is provided which includes a detection step of detecting a facial region of a person in an input image to be transformed, a first concealing step of transforming the detected facial region into a distorted first image that does not have a facial shape of the person so that the person in the input image is prevented from being identified, and a second concealing step of generating a second image having a predetermined facial shape based on the first image, transforming the first image into the second image, where the second image is generated to have a facial shape different from that of the facial region detected in the detection step.

However, according to conventional techniques as well as the technique described above, it is determined whether identification information such as faces, text, etc. is included in the data, and then a portion corresponding to the identification information is masked or blurred. As a result, a machine learning algorithm cannot utilize such data due to distortion of original data. Also, in some cases, the data may contain unexpected identification information which cannot be concealed, e.g., anonymized. In particular, a conventional security camera performs an anonymizing process by blurring every pixel changed between frames due to a target to be anonymized moving between the frames in a video, and if the anonymizing process is performed in this manner, critical information such as facial expression of an anonymized face becomes different from information contained in an original video, and also, personal identification information overlooked during face detection may remain on the original video.

Accordingly, the applicant of the present disclosure proposes a method for generating obfuscated data by obfuscating the original data such that the obfuscated data is different from the original data, while a result of inputting the original data into a learning model and a result of inputting the obfuscated data into the learning model are same as or similar to each other.

SUMMARY OF THE DISCLOSURE

It is an object of the present disclosure to solve all the aforementioned problems.

It is another object of the present disclosure to perform obfuscation, e.g., anonymization or concealment, in a simple and accurate way, by eliminating processes of searching general data for personal identification information and processes of obfuscating, e.g., anonymizing or concealing, the personal identification information.

It is still another object of the present disclosure to protect privacy and security of original data by generating obfuscated data, e.g., anonymized data or concealed data, through irreversibly obfuscating the original data.

It is still yet another object of the present disclosure to generate obfuscated data recognized as similar or same by computers, but recognized as different by humans.

It is still yet another object of the present disclosure to stimulate a big data trade market.

In order to accomplish the objects above, distinctive structures of the present disclosure are described as follows.

In accordance with one aspect of the present disclosure, there is provided a method for training an obfuscation network to be used for obfuscating original data to protect personal information, including steps of: (a) if training data is acquired, a learning device performing or supporting another device to perform (i) a process of inputting the training data into an obfuscation network, to thereby allow the obfuscation network to obfuscate the training data and thus to generate obfuscated training data and (ii) a process of inputting the obfuscated training data into an augmentation network, to thereby allow the augmentation network to augment the obfuscated training data and thus to generate augmented obfuscated training data; (b) the learning device performing or supporting another device to perform (i) a process of inputting the augmented obfuscated training data into a learning network having one or more learned parameters, to thereby allow the learning network to (i-1) apply a learning operation to the augmented obfuscated training data by using the learned parameters and thus (i-2) generate first characteristic information for training corresponding to the augmented obfuscated training data and (ii) a process of inputting the training data into the learning network, to thereby allow the learning network to (ii-1) apply the learning operation to the training data by using the learned parameters and thus (ii-2) generate second characteristic information for training corresponding to the training data; and (c) the learning device performing or supporting another device to perform a process of training the obfuscation network such that (i) at least one first error, calculated by referring to the first characteristic information for training and the second characteristic information for training, is minimized and (ii) at least one second error, calculated by referring to (ii-1) (ii-1-a) modified training data, created by modifying the training data, or modified obfuscated training data, created by modifying the obfuscated training data, and (ii-1-b) the obfuscated training data or (ii-2) (ii-2-a) the modified training data or the modified obfuscated training data and (ii-2-b) the augmented obfuscated training data, is maximized.

As one example, the learning network includes a 1st learning network to an n-th learning network respectively having one or more 1st learned parameters to one or more n-th learned parameters wherein n is an integer greater than 0, wherein, at the step of (b), the learning device performs or supports another device to perform (i) a process of inputting the augmented obfuscated training data into each of the first learning network to the n-th learning network, to thereby allow each of the first learning network to the n-th learning network to (i-1) apply its corresponding learning operation to the augmented obfuscated training data by using respectively the first learned parameters to the n-th learned parameters of the first learning network to the n-th learning network, and thus (i-2) output each piece of (1_1)-st characteristic information for training to (1_n)-th characteristic information for training on the augmented obfuscated training data and (ii) a process of inputting the training data into each of the first learning network to the n-th learning network, to thereby allow each of the first learning network to the n-th learning network to (ii-1) apply its corresponding learning operation to the training data by using respectively the first learned parameters to the n-th learned parameters, and thus (ii-2) output each piece of (2_1)-st characteristic information for training to (2_n)-th characteristic information for training on the training data, and wherein, at the step of (c), the learning device performs or supports another device to perform a process of training the obfuscation network such that the first error, which is an average over (1) a (1_1)-st error calculated by referring to the (1_1)-st characteristic information for training and the (2_1)-st characteristic information for training to (2) a (1_n)-th error calculated by referring to the (1_n)-th characteristic information for training and the (2_n)-th characteristic information for training, is minimized and such that the second error is maximized.

As one example, the learning network includes a first learning network to an n-th learning network respectively having one or more first learned parameters to one or more n-th learned parameters wherein n is an integer greater than 0, wherein, at the step of (a), the learning device performs or supports another device to perform (i) a process of inputting the training data into the obfuscation network, to thereby allow the obfuscation network to obfuscate the training data and thus to generate first obfuscated training data and (ii) a process of inputting the first obfuscated training data into the augmentation network, to thereby allow the augmentation network to augment the first obfuscated training data and thus to generate first augmented obfuscated training data, wherein, at the step of (b), the learning device performs or supports another device to perform (i) a process of inputting the first augmented obfuscated training data into the first learning network, to thereby allow the first learning network to (i-1) apply the learning operation to the first augmented obfuscated training data by using the first learned parameters of the first learning network and thus (i-2) output (1_1)-st characteristic information for training on the first augmented obfuscated training data and (ii) a process of inputting the training data into the first learning network, to thereby allow the first learning network to (ii-1) apply the learning operation to the training data by using the first learned parameters and thus (ii-2) output (2_1)-st characteristic information for training on the training data, wherein, at the step of (c), the learning device performs or supports another device to perform a process of training the obfuscation network such that (i) at least one (1_1)-st error, calculated by referring to the (1_1)-st characteristic information for training and the (2_1)-st characteristic information for training, is minimized and (ii) at least one (2_1)-st error, calculated by referring to (ii-1) (ii-1-a) the modified training data or first modified obfuscated training data created by modifying the first obfuscated training data and (ii-1-b) the first obfuscated training data or (ii-2) (ii-2-a) the modified training data or the first modified obfuscated training data and (ii-2-b) the first augmented obfuscated training data, is maximized, to thereby allow the obfuscation network to be a first trained obfuscation network, and wherein, while increasing an integer k from 2 to n, the learning device performs or supports another device to perform (i) a process of inputting the training data into the (k−1)-th trained obfuscation network, to thereby allow the (k−1)-th trained obfuscation network to obfuscate the training data and thus to generate k-th obfuscated training data and a process of inputting the k-th obfuscated training data into the augmentation network, to thereby allow the augmentation network to augment the k-th obfuscated training data and thus to generate k-th augmented obfuscated training data, (ii) (ii-1) a process of inputting the k-th augmented obfuscated training data into a k-th learning network, to thereby allow the k-th learning network to apply the learning operation to the k-th augmented obfuscated training data by using one or more k-th learned parameters of the k-th learning network and thus to output (1_k)-th characteristic information for training on the k-th augmented obfuscated training data and (ii-2) a process of inputting the training data into the k-th learning network, to thereby allow the k-th learning network to apply the learning operation to the training data by using the k-th learned parameters and thus to output (2_k)-th characteristic information for training on the training data, and (iii) a process of training the (k−1)-th trained obfuscation network such that at least one (1_k)-th error, calculated by referring to the (1_k)-th characteristic information for training and the (2_k)-th characteristic information for training, is minimized and such that at least one (2_k)-th error, which is calculated by referring to (iii-1) (iii-1-a) the modified training data or k-th modified obfuscated training data calculated by modifying the k-th obfuscated training data and (iii-1-b) the k-th obfuscated training data or (iii-2) (iii-2-a) the modified training data or the k-th modified obfuscated training data and (iii-2-b) the k-th augmented obfuscated training data, is maximized, to thereby allow the (k−1)-th trained obfuscation network to be a k-th trained obfuscation network.

As one example, at the step of (c), on condition that an obfuscated training data score, corresponding to the obfuscated training data inputted into a discriminator capable of determining whether its inputted data is real or fake or the augmented obfuscated training data inputted into the discriminator, has been acquired as the second error, the learning device performs or supports another device to perform a process of training the obfuscation network such that the first error is minimized and the second error is maximized and a process of training the discriminator such that a training data score, corresponding to the modified training data inputted into the discriminator or the modified obfuscated training data inputted into the discriminator, is maximized and such that the obfuscated training data score is minimized.

As one example, the learning network includes a first learning network to an n-th learning network respectively having one or more first learned parameters to one or more n-th learned parameters wherein n is an integer greater than 0, wherein, at the step of (b), the learning device performs or supports another device to perform (i) a process of inputting the augmented obfuscated training data into each of the first learning network to the n-th learning network, to thereby allow each of the first learning network to the n-th learning network to (i-1) apply its corresponding learning operation to the augmented obfuscated training data by using respectively the first learned parameters to the n-th learned parameters of the first learning network to the n-th learning network, and thus (i-2) output each piece of (1_1)-st characteristic information for training to (1_n)-th characteristic information for training on the augmented obfuscated training data and (ii) a process of inputting the training data into each of the first learning network to the n-th learning network, to thereby allow each of the first learning network to the n-th learning network to (ii-1) apply its corresponding learning operation to the training data by using respectively the first learned parameters to the n-th learned parameters, and thus (ii-2) output each piece of (2_1)-st characteristic information for training to (2_n)-th characteristic information for training on the training data, and wherein, at the step of (c), the learning device performs or supports another device to perform (i) a process of training the obfuscation network such that the first error, which is an average over (i-1) at least one (1_1)-st error calculated by referring to the (1_1)-st characteristic information for training and the (2_1)-st characteristic information for training to (i-2) at least one (1_n)-th error calculated by referring to the (1_n)-th characteristic information for training and the (2_n)-th characteristic information for training, is minimized and such that the second error, which is the obfuscated training data score, corresponding to the obfuscated training data inputted into the discriminator or the augmented obfuscated training data inputted into the discriminator, is maximized and (ii) a process of training the discriminator such that the training data score, corresponding to the modified training data inputted into the discriminator or the modified obfuscated training data inputted into the discriminator, is maximized and such that the obfuscated training data score is minimized.

As one example, the learning network includes a first learning network to an n-th learning network respectively having one or more first learned parameters to one or more n-th learned parameters wherein n is an integer greater than 0, wherein, at the step of (a), the learning device performs or supports another device to perform (i) a process of inputting the training data into the obfuscation network, to thereby allow the obfuscation network to obfuscate the training data and thus to generate first obfuscated training data and (ii) a process of inputting the first obfuscated training data into the augmentation network, to thereby allow the augmentation network to augment the first obfuscated training data and thus to generate first augmented obfuscated training data, wherein, at the step of (b), the learning device performs or supports another device to perform (i) a process of inputting the first augmented obfuscated training data into the first learning network, to thereby allow the first learning network to (i-1) apply the learning operation to the first augmented obfuscated training data by using the first learned parameters of the first learning network and thus (i-2) output (1_1)-st characteristic information for training on the first augmented obfuscated training data and (ii) a process of inputting the training data into the first learning network, to thereby allow the first learning network to (ii-1) apply the learning operation to the training data by using the first learned parameters and thus (ii-2) output (2_1)-st characteristic information for training on the training data, wherein, at the step of (c), the learning device performs or supports another device to perform (i) a process of training the obfuscation network such that at least one (1_1)-st error, calculated by referring to the (1_1)-st characteristic information for training and the (2_1)-st characteristic information for training, is minimized and such that at least one (2_1)-st error, which is a first obfuscated training data score, corresponding to the first obfuscated training data inputted into the discriminator or the first augmented obfuscated training data inputted into the discriminator, is maximized, to thereby allow the obfuscation network to be a first trained obfuscation network and (ii) a process of training the discriminator such that a first training data score, corresponding to the modified training data inputted into the discriminator or first modified obfuscated training data inputted into the discriminator, is maximized and such that the first obfuscated training data score is minimized, to thereby allow the discriminator to be a first trained discriminator, wherein the first modified obfuscated training data is created by modifying the first obfuscated training data and wherein, while increasing an integer k from 2 to n, the learning device performs or supports another device to perform (i) a process of inputting the training data into the (k−1)-th trained obfuscation network, to thereby allow the (k−1)-th trained obfuscation network to obfuscate the training data and thus to generate k-th obfuscated training data and a process of inputting the k-th obfuscated training data into the augmentation network, to thereby allow the augmentation network to augment the k-th obfuscated training data and thus to generate k-th augmented obfuscated training data, (ii) (ii-1) a process of inputting the k-th augmented obfuscated training data into a k-th learning network, to thereby allow the k-th learning network to apply the learning operation to the k-th augmented obfuscated training data by using one or more k-th learned parameters of the k-th learning network and thus to output (1_k)-th characteristic information for training on the k-th augmented obfuscated training data and (ii-2) a process of inputting the training data into the k-th learning network, to thereby allow the k-th learning network to apply the learning operation to the training data by using the k-th learned parameters and thus to output (2_k)-th characteristic information for training on the training data, and (iii) (iii-1) a process of training the (k−1)-th trained obfuscation network such that at least one (1_k)-th error, calculated by referring to the (1_k)-th characteristic information for training and the (2_k)-th characteristic information for training, is minimized and such that at least one (2_k)-th error, which is a k-th obfuscated training data score, corresponding to the k-th obfuscated training data inputted into a (k−1)-th trained discriminator or the k-th augmented obfuscated training data inputted into the (k−1)-th trained discriminator, is maximized, to thereby allow the (k−1)-th trained obfuscation network to be a k-th trained obfuscation network and (iii-2) a process of training the (k−1)-th trained discriminator such that a k-th training data score, corresponding to the modified training data inputted into the (k−1)-th trained discriminator or k-th modified obfuscated training data inputted into the (k−1)-th trained discriminator, is maximized and such that the k-th obfuscated training data is minimized, to thereby allow the (k−1)-th trained discriminator to be a k-th trained discriminator, wherein the k-th modified obfuscated training data is created by modifying the k-th obfuscated training data.

As one example, a maximum of the training data score, corresponding to the modified training data inputted into the discriminator or the modified obfuscated training data inputted into the discriminator, is 1 as a value for determining the modified training data or the modified obfuscated training data as real and wherein a minimum of the obfuscated training data score, corresponding to the obfuscated training data inputted into the discriminator or the augmented obfuscated training data inputted into the discriminator, is O as a value for determining the obfuscated training data or the augmented obfuscated training data as fake.

As one example, at the step of (c), the learning device performs or supports another device to perform a process of calculating the first error by referring to a difference between the first characteristic information for training and the second characteristic information for training and a process of calculating the second error by referring to (1) a difference between (1-a) the modified training data or the modified obfuscated training data and (1-b) the obfuscated training data or (2) a difference between (2-a) the modified training data or the modified obfuscated training data and (2-b) the augmented obfuscated training data.

As one example, the learning device performs or supports another device to perform a process of acquiring the first error by referring to a norm or a cosine similarity between the first characteristic information for training and the second characteristic information for training.

As one example, at the step of (c), the learning device performs or supports another device to perform a process of calculating the first error by further referring to at least one class loss which is calculated by referring to (1) each of probabilities that each piece of the first characteristic information for training, each piece of which is mapped onto each class, belongs to its corresponding class and (2) a ground truth corresponding to the training data.

As one example, at the step of (c), the learning device performs or supports another device to perform a process of measuring at least one quality by referring to at least part of an entropy of the augmented obfuscated training data and a degree of noise of the augmented obfuscated training data and a process of acquiring the first error by further referring to the measured quality.

In accordance with another aspect of the present disclosure, there is provided a method for testing an obfuscation network to be used for obfuscating original data to protect personal information, including: a testing device, on condition that the learning device has performed or supported another device to perform (i) a process of inputting training data into an obfuscation network, to thereby allow the obfuscation network to obfuscate the training data and thus to generate obfuscated training data and a process of inputting the obfuscated training data into an augmentation network, to thereby allow the augmentation network to augment the obfuscated training data and thus to generate augmented obfuscated training data, (ii) (ii-1) a process of inputting the augmented obfuscated training data into a learning network having one or more learned parameters, to thereby allow the learning network to apply a learning operation to the augmented obfuscated training data by using the learned parameters and thus to output first characteristic information for training on the augmented obfuscated training data and (ii-2) a process of inputting the training data into the learning network, to thereby allow the learning network to apply the learning operation to the training data by using the learned parameters and thus to output second characteristic information for training on the training data, and (iii) a process of training the obfuscation network such that at least one first error, calculated by referring to the first characteristic information for training and the second characteristic information for training, is minimized and such that at least one second error, which is calculated by referring to (iii-1) (iii-1-a) modified training data, created by modifying the training data, or modified obfuscated training data, created by modifying the obfuscated training data, and (iii-1-b) the obfuscated training data or (iii-2) (iii-2-a) the modified training data or the modified obfuscated training data and (iii-2-b) the augmented obfuscated training data, is maximized, performing or supporting another device to perform a process of acquiring test data; and (b) the testing device performing or supporting another device to perform a process of inputting the test data into the obfuscation network, which is trained to support augmentation, to thereby allow the obfuscation network to obfuscate the test data by using the learned parameters of the obfuscation network and thus to output obfuscated test data.

As one example, at the step of (a), the learning network includes a first learning network to an n-th learning network respectively having one or more first parameters to one or more n-th learned parameters wherein n is an integer greater than 0, and wherein the learning device has performed or supported another device to perform (i) a process of inputting the augmented obfuscated training data into each of the first learning network to the n-th learning network, to thereby allow each of the first learning network to the n-th learning network to (i-1) apply its corresponding learning operation to the augmented obfuscated training data by using respectively the first learned parameters to the n-th learned parameters of the first learning network to the n-th learning network, and thus (i-2) output each piece of (1_1)-st characteristic information for training to (1_n)-th characteristic information for training on the augmented obfuscated training data, (ii) a process of inputting the training data into each of the first learning network to the n-th learning network, to thereby allow each of the first learning network to the n-th learning network to (ii-1) apply its corresponding learning operation to the training data by using respectively the first learned parameters to the n-th learned parameters, and thus (ii-2) output each piece of (2_1)-st characteristic information for training to (2_n)-th characteristic information for training on the training data, and (iii) a process of training the obfuscation network such that the first error is minimized which is an average over (iii-1) the (1_1)-st error acquired by referring to the (1_1)-st characteristic information for training and the (2_1)-st characteristic information for training to (iii-2) the (1_n)-th error acquired by referring to the (1_n)-th characteristic information for training and the (2_n)-th characteristic information for training and such that the second error is maximized which is calculated by referring to (iii-3) (iii-3-a) the modified training data or the modified obfuscated training data and (iii-3-b) the obfuscated training data or (iii-4) (iii-4-a) the modified training data or the modified obfuscated training data and (iii-4-b) the augmented obfuscated training data.

As one example, at the step of (a), upon acquiring an obfuscated training data score, as the second error, corresponding to the obfuscated training data inputted into a discriminator capable of determining whether its inputted data is real or fake or the augmented obfuscated training data inputted into the discriminator, the learning device has performed or supported another device to perform a process of training the obfuscation network such that the first error is minimized and the second error is maximized and a process of training the discriminator such that a training data score, corresponding to the modified training data inputted into the discriminator or the modified obfuscated training data inputted into the discriminator, is maximized and such that the obfuscated training data score is minimized.

As one example, at the step of (a), the learning network includes a first learning network to an n-th learning network respectively having one or more first learned parameters to one or more n-th learned parameters wherein n is an integer greater than 0, and wherein the learning device has performed or supported another device to perform (i) a process of inputting the augmented obfuscated training data into each of the first learning network to the n-th learning network, to thereby allow each of the first learning network to the n-th learning network to (i-1) apply its corresponding learning operation to the augmented obfuscated training data by using respectively the first learned parameters to the n-th learned parameters of the first learning network to the n-th learning network, and thus (i-2) output each piece of (1_1)-st characteristic information for training to (1_n)-th characteristic information for training on the augmented obfuscated training data, (ii) a process of inputting the training data into each of the first learning network to the n-th learning network, to thereby allow each of the first learning network to the n-th learning network to (ii-1) apply its corresponding learning operation to the training data by using respectively the first learned parameters to the n-th learned parameters, and thus (ii-2) output each piece of (2_1)-st characteristic information for training to (2_n)-th characteristic information for training on the training data, and (iii) a process of training the obfuscation network such that the first error is minimized which is an average over (iii-1) the (1_1)-st error acquired by referring to the (1_1)-st characteristic information for training and the (2_1)-st characteristic information for training to (iii-2) the (1_n)-th error acquired by referring to the (1_n)-th characteristic information for training and the (2_n)-th characteristic information for training and such that the second error which is the obfuscated training data score, corresponding to the obfuscated training data inputted into the discriminator or the augmented obfuscated training data inputted into the discriminator, is maximized and (iv) a process of training the discriminator such that the training data score, corresponding to the modified training data inputted into the discriminator or the modified obfuscated training data inputted into the discriminator, is maximized and such that the obfuscated training data score is minimized.

In accordance with still another aspect of the present disclosure, there is provided a learning device for training an obfuscation network to be used for obfuscating original data to protect personal information, including at least one memory that stores instructions; and at least one processor configured to execute the instructions to perform or support another device to perform: (I) if training data is acquired, (i) a process of inputting the training data into an obfuscation network, to thereby allow the obfuscation network to obfuscate the training data and thus to generate obfuscated training data and (ii) a process of inputting the obfuscated training data into an augmentation network, to thereby allow the augmentation network to augment the obfuscated training data and thus to generate augmented obfuscated training data, (II) (i) a process of inputting the augmented obfuscated training data into a learning network having one or more learned parameters, to thereby allow the learning network to (i-1) apply a learning operation to the augmented obfuscated training data by using the learned parameters and thus (i-2) generate first characteristic information for training corresponding to the augmented obfuscated training data and (ii) a process of inputting the training data into the learning network, to thereby allow the learning network to (ii-1) apply the learning operation to the training data by using the learned parameters and thus (ii-2) generate second characteristic information for training corresponding to the training data, and (III) a process of training the obfuscation network such that (i) at least one first error, calculated by referring to the first characteristic information for training and the second characteristic information for training, is minimized and (ii) at least one second error, calculated by referring to (ii-1) (ii-1-a) modified training data, created by modifying the training data, or modified obfuscated training data, created by modifying the obfuscated training data, and (ii-1-b) the obfuscated training data or (ii-2) (ii-2-a) the modified training data or the modified obfuscated training data and (ii-2-b) the augmented obfuscated training data, is maximized.

As one example, the learning network includes a 1st learning network to an n-th learning network respectively having one or more 1st learned parameters to one or more n-th learned parameters wherein n is an integer greater than 0, wherein, at the process of (II), the processor performs or supports another device to perform (i) a process of inputting the augmented obfuscated training data into each of the first learning network to the n-th learning network, to thereby allow each of the first learning network to the n-th learning network to (i-1) apply its corresponding learning operation to the augmented obfuscated training data by using respectively the first learned parameters to the n-th learned parameters of the first learning network to the n-th learning network, and thus (i-2) output each piece of (1_1)-st characteristic information for training to (1_n)-th characteristic information for training on the augmented obfuscated training data and (ii) a process of inputting the training data into each of the first learning network to the n-th learning network, to thereby allow each of the first learning network to the n-th learning network to (ii-1) apply its corresponding learning operation to the training data by using respectively the first learned parameters to the n-th learned parameters, and thus (ii-2) output each piece of (2_1)-st characteristic information for training to (2_n)-th characteristic information for training on the training data, and wherein, at the process of (III), the processor performs or supports another device to perform a process of training the obfuscation network such that the first error, which is an average over (1) a (1_1)-st error calculated by referring to the (1_1)-st characteristic information for training and the (2_1)-st characteristic information for training to (2) a (1_n)-th error calculated by referring to the (1_n)-th characteristic information for training and the (2_n)-th characteristic information for training, is minimized and such that the second error is maximized.

As one example, the learning network includes a first learning network to an n-th learning network respectively having one or more first learned parameters to one or more n-th learned parameters wherein n is an integer greater than 0, wherein, at the process of (I), the processor performs or supports another device to perform (i) a process of inputting the training data into the obfuscation network, to thereby allow the obfuscation network to obfuscate the training data and thus to generate first obfuscated training data and (ii) a process of inputting the first obfuscated training data into the augmentation network, to thereby allow the augmentation network to augment the first obfuscated training data and thus to generate first augmented obfuscated training data, wherein, at the process of (II), the processor performs or supports another device to perform (i) a process of inputting the first augmented obfuscated training data into the first learning network, to thereby allow the first learning network to (i-1) apply the learning operation to the first augmented obfuscated training data by using the first learned parameters of the first learning network and thus (i-2) output (1_1)-st characteristic information for training on the first augmented obfuscated training data and (ii) a process of inputting the training data into the first learning network, to thereby allow the first learning network to (ii-1) apply the learning operation to the training data by using the first learned parameters and thus (ii-2) output (2_1)-st characteristic information for training on the training data, wherein, at the process of (III), the processor performs or supports another device to perform a process of training the obfuscation network such that (i) at least one (1_1)-st error, calculated by referring to the (1_1)-st characteristic information for training and the (2_1)-st characteristic information for training, is minimized and (ii) at least one (2_1)-st error, calculated by referring to (ii-1) (ii-1-a) the modified training data or first modified obfuscated training data created by modifying the first obfuscated training data and (ii-1-b) the first obfuscated training data or (ii-2) (ii-2-a) the modified training data or the first modified obfuscated training data and (ii-2-b) the first augmented obfuscated training data, is maximized, to thereby allow the obfuscation network to be a first trained obfuscation network, and wherein, while increasing an integer k from 2 to n, the processor performs or supports another device to perform (i) a process of inputting the training data into the (k−1)-th trained obfuscation network, to thereby allow the (k−1)-th trained obfuscation network to obfuscate the training data and thus to generate k-th obfuscated training data and a process of inputting the k-th obfuscated training data into the augmentation network, to thereby allow the augmentation network to augment the k-th obfuscated training data and thus to generate k-th augmented obfuscated training data, (ii) (ii-1) a process of inputting the k-th augmented obfuscated training data into a k-th learning network, to thereby allow the k-th learning network to apply the learning operation to the k-th augmented obfuscated training data by using one or more k-th learned parameters of the k-th learning network and thus to output (1_k)-th characteristic information for training on the k-th augmented obfuscated training data and (ii-2) a process of inputting the training data into the k-th learning network, to thereby allow the k-th learning network to apply the learning operation to the training data by using the k-th learned parameters and thus to output (2_k)-th characteristic information for training on the training data, and (iii) a process of training the (k−1)-th trained obfuscation network such that at least one (1_k)-th error, calculated by referring to the (1_k)-th characteristic information for training and the (2_k)-th characteristic information for training, is minimized and such that at least one (2_k)-th error, which is calculated by referring to (iii-1) (iii-1-a) the modified training data or k-th modified obfuscated training data calculated by modifying the k-th obfuscated training data and (iii-1-b) the k-th obfuscated training data or (iii-2) (iii-2-a) the modified training data or the k-th modified obfuscated training data and (iii-2-b) the k-th augmented obfuscated training data, is maximized, to thereby allow the (k−1)-th trained obfuscation network to be a k-th trained obfuscation network.

As one example, at the process of (III), on condition that an obfuscated training data score, corresponding to the obfuscated training data inputted into a discriminator capable of determining whether its inputted data is real or fake or the augmented obfuscated training data inputted into the discriminator, has been acquired as the second error, the processor performs or supports another device to perform a process of training the obfuscation network such that the first error is minimized and the second error is maximized and a process of training the discriminator such that a training data score, corresponding to the modified training data inputted into the discriminator or the modified obfuscated training data inputted into the discriminator, is maximized and such that the obfuscated training data score is minimized.

As one example, the learning network includes a first learning network to an n-th learning network respectively having one or more first learned parameters to one or more n-th learned parameters wherein n is an integer greater than 0, wherein, at the process of (II), the processor performs or supports another device to perform (i) a process of inputting the augmented obfuscated training data into each of the first learning network to the n-th learning network, to thereby allow each of the first learning network to the n-th learning network to (i-1) apply its corresponding learning operation to the augmented obfuscated training data by using respectively the first learned parameters to the n-th learned parameters of the first learning network to the n-th learning network, and thus (i-2) output each piece of (1_1)-st characteristic information for training to (1_n)-th characteristic information for training on the augmented obfuscated training data and (ii) a process of inputting the training data into each of the first learning network to the n-th learning network, to thereby allow each of the first learning network to the n-th learning network to (ii-1) apply its corresponding learning operation to the training data by using respectively the first learned parameters to the n-th learned parameters, and thus (ii-2) output each piece of (2_1)-st characteristic information for training to (2_n)-th characteristic information for training on the training data, and wherein, at the process of (III), the processor performs or supports another device to perform (i) a process of training the obfuscation network such that the first error, which is an average over (i-1) at least one (1_1)-st error calculated by referring to the (1_1)-st characteristic information for training and the (2_1)-st characteristic information for training to (i-2) at least one (1_n)-th error calculated by referring to the (1_n)-th characteristic information for training and the (2_n)-th characteristic information for training, is minimized and such that the second error, which is the obfuscated training data score, corresponding to the obfuscated training data inputted into the discriminator or the augmented obfuscated training data inputted into the discriminator, is maximized and (ii) a process of training the discriminator such that the training data score, corresponding to the modified training data inputted into the discriminator or the modified obfuscated training data inputted into the discriminator, is maximized and such that the obfuscated training data score is minimized.

As one example, the learning network includes a first learning network to an n-th learning network respectively having one or more first learned parameters to one or more n-th learned parameters wherein n is an integer greater than 0, wherein, at the process of (I), the processor performs or supports another device to perform (i) a process of inputting the training data into the obfuscation network, to thereby allow the obfuscation network to obfuscate the training data and thus to generate first obfuscated training data and (ii) a process of inputting the first obfuscated training data into the augmentation network, to thereby allow the augmentation network to augment the first obfuscated training data and thus to generate first augmented obfuscated training data, wherein, at the process of (II), the processor performs or supports another device to perform (i) a process of inputting the first augmented obfuscated training data into the first learning network, to thereby allow the first learning network to (i-1) apply the learning operation to the first augmented obfuscated training data by using the first learned parameters of the first learning network and thus (i-2) output (1_1)-st characteristic information for training on the first augmented obfuscated training data and (ii) a process of inputting the training data into the first learning network, to thereby allow the first learning network to (ii-1) apply the learning operation to the training data by using the first learned parameters and thus (ii-2) output (2_1)-st characteristic information for training on the training data, wherein, at the process of (III), the processor performs or supports another device to perform (i) a process of training the obfuscation network such that at least one (1_1)-st error, calculated by referring to the (1_1)-st characteristic information for training and the (2_1)-st characteristic information for training, is minimized and such that at least one (2_1)-st error, which is a first obfuscated training data score, corresponding to the first obfuscated training data inputted into the discriminator or the first augmented obfuscated training data inputted into the discriminator, is maximized, to thereby allow the obfuscation network to be a first trained obfuscation network and (ii) a process of training the discriminator such that a first training data score, corresponding to the modified training data inputted into the discriminator or first modified obfuscated training data inputted into the discriminator, is maximized and such that the first obfuscated training data score is minimized, to thereby allow the discriminator to be a first trained discriminator, wherein the first modified obfuscated training data is created by modifying the first obfuscated training data and wherein, while increasing an integer k from 2 to n, the processor performs or supports another device to perform (i) a process of inputting the training data into the (k−1)-th trained obfuscation network, to thereby allow the (k−1)-th trained obfuscation network to obfuscate the training data and thus to generate k-th obfuscated training data and a process of inputting the k-th obfuscated training data into the augmentation network, to thereby allow the augmentation network to augment the k-th obfuscated training data and thus to generate k-th augmented obfuscated training data, (ii) (ii-1) a process of inputting the k-th augmented obfuscated training data into a k-th learning network, to thereby allow the k-th learning network to apply the learning operation to the k-th augmented obfuscated training data by using one or more k-th learned parameters of the k-th learning network and thus to output (1_k)-th characteristic information for training on the k-th augmented obfuscated training data and (ii-2) a process of inputting the training data into the k-th learning network, to thereby allow the k-th learning network to apply the learning operation to the training data by using the k-th learned parameters and thus to output (2_k)-th characteristic information for training on the training data, and (iii) (iii-1) a process of training the (k−1)-th trained obfuscation network such that at least one (1_k)-th error, calculated by referring to the (1_k)-th characteristic information for training and the (2_k)-th characteristic information for training, is minimized and such that at least one (2_k)-th error, which is a k-th obfuscated training data score, corresponding to the k-th obfuscated training data inputted into a (k−1)-th trained discriminator or the k-th augmented obfuscated training data inputted into the (k−1)-th trained discriminator, is maximized, to thereby allow the (k−1)-th trained obfuscation network to be a k-th trained obfuscation network and (iii-2) a process of training the (k−1)-th trained discriminator such that a k-th training data score, corresponding to the modified training data inputted into the (k−1)-th trained discriminator or k-th modified obfuscated training data inputted into the (k−1)-th trained discriminator, is maximized and such that the k-th obfuscated training data is minimized, to thereby allow the (k−1)-th trained discriminator to be a k-th trained discriminator, wherein the k-th modified obfuscated training data is created by modifying the k-th obfuscated training data.

As one example, a maximum of the training data score, corresponding to the modified training data inputted into the discriminator or the modified obfuscated training data inputted into the discriminator, is 1 as a value for determining the modified training data or the modified obfuscated training data as real and wherein a minimum of the obfuscated training data score, corresponding to the obfuscated training data inputted into the discriminator or the augmented obfuscated training data inputted into the discriminator, is 0 as a value for determining the obfuscated training data or the augmented obfuscated training data as fake.

As one example, at the process of (III), the processor performs or supports another device to perform a process of calculating the first error by referring to a difference between the first characteristic information for training and the second characteristic information for training and a process of calculating the second error by referring to (1) a difference between (1-a) the modified training data or the modified obfuscated training data and (1-b) the obfuscated training data or (2) a difference between (2-a) the modified training data or the modified obfuscated training data and (2-b) the augmented obfuscated training data.

As one example, the processor performs or supports another device to perform a process of acquiring the first error by referring to a norm or a cosine similarity between the first characteristic information for training and the second characteristic information for training.

As one example, at the process of (III), the processor performs or supports another device to perform a process of calculating the first error by further referring to at least one class loss which is calculated by referring to (1) each of probabilities that each piece of the first characteristic information for training, each piece of which is mapped onto each class, belongs to its corresponding class and (2) a ground truth corresponding to the training data.

As one example, at the process of (III), the processor performs or supports another device to perform a process of measuring at least one quality by referring to at least part of an entropy of the augmented obfuscated training data and a degree of noise of the augmented obfuscated training data and a process of acquiring the first error by further referring to the measured quality.

In accordance with still yet another aspect of the present disclosure, there is provided a testing device for testing an obfuscation network to be used for obfuscating original data to protect personal information, including: at least one memory that stores instructions; and at least one processor configured to execute the instructions to perform or support another device to perform: (I) on condition that the learning device has performed or supported another device to perform (i) a process of inputting training data into an obfuscation network, to thereby allow the obfuscation network to obfuscate the training data and thus to generate obfuscated training data and a process of inputting the obfuscated training data into an augmentation network, to thereby allow the augmentation network to augment the obfuscated training data and thus to generate augmented obfuscated training data, (ii) (ii-1) a process of inputting the augmented obfuscated training data into a learning network having one or more learned parameters, to thereby allow the learning network to apply a learning operation to the augmented obfuscated training data by using the learned parameters and thus to output first characteristic information for training on the augmented obfuscated training data and (ii-2) a process of inputting the training data into the learning network, to thereby allow the learning network to apply the learning operation to the training data by using the learned parameters and thus to output second characteristic information for training on the training data, and (iii) a process of training the obfuscation network such that at least one first error, calculated by referring to the first characteristic information for training and the second characteristic information for training, is minimized and such that at least one second error, which is calculated by referring to (iii-1) (iii-1-a) modified training data, created by modifying the training data, or modified obfuscated training data, created by modifying the obfuscated training data, and (iii-1-b) the obfuscated training data or (iii-2) (iii-2-a) the modified training data or the modified obfuscated training data and (iii-2-b) the augmented obfuscated training data, is maximized, process of acquiring test data, and (II) a process of inputting the test data into the obfuscation network, which is trained to support augmentation, to thereby allow the obfuscation network to obfuscate the test data by using the learned parameters of the obfuscation network and thus to output obfuscated test data.

As one example, at the process of (I), the learning network includes a first learning network to an n-th learning network respectively having one or more first parameters to one or more n-th learned parameters wherein n is an integer greater than 0, and wherein the learning device has performed or supported another device to perform (i) a process of inputting the augmented obfuscated training data into each of the first learning network to the n-th learning network, to thereby allow each of the first learning network to the n-th learning network to (i-1) apply its corresponding learning operation to the augmented obfuscated training data by using respectively the first learned parameters to the n-th learned parameters of the first learning network to the n-th learning network, and thus (i-2) output each piece of (1_1)-st characteristic information for training to (1_n)-th characteristic information for training on the augmented obfuscated training data, (ii) a process of inputting the training data into each of the first learning network to the n-th learning network, to thereby allow each of the first learning network to the n-th learning network to (ii-1) apply its corresponding learning operation to the training data by using respectively the first learned parameters to the n-th learned parameters, and thus (ii-2) output each piece of (2_1)-st characteristic information for training to (2_n)-th characteristic information for training on the training data, and (iii) a process of training the obfuscation network such that the first error is minimized which is an average over (iii-1) the (1_1)-st error acquired by referring to the (1_1)-st characteristic information for training and the (2_1)-st characteristic information for training to (iii-2) the (1_n)-th error acquired by referring to the (1_n)-th characteristic information for training and the (2_n)-th characteristic information for training and such that the second error is maximized which is calculated by referring to (iii-3) (iii-3-a) the modified training data or the modified obfuscated training data and (iii-3-b) the obfuscated training data or (iii-4) (iii-4-a) the modified training data or the modified obfuscated training data and (iii-4-b) the augmented obfuscated training data.

As one example, at the process of (I), upon acquiring an obfuscated training data score, as the second error, corresponding to the obfuscated training data inputted into a discriminator capable of determining whether its inputted data is real or fake or the augmented obfuscated training data inputted into the discriminator, the learning device has performed or supported another device to perform a process of training the obfuscation network such that the first error is minimized and the second error is maximized and a process of training the discriminator such that a training data score, corresponding to the modified training data inputted into the discriminator or the modified obfuscated training data inputted into the discriminator, is maximized and such that the obfuscated training data score is minimized.

As one example, at the process of (I), the learning network includes a first learning network to an n-th learning network respectively having one or more first learned parameters to one or more n-th learned parameters wherein n is an integer greater than 0, and wherein the learning device has performed or supported another device to perform (i) a process of inputting the augmented obfuscated training data into each of the first learning network to the n-th learning network, to thereby allow each of the first learning network to the n-th learning network to (i-1) apply its corresponding learning operation to the augmented obfuscated training data by using respectively the first learned parameters to the n-th learned parameters of the first learning network to the n-th learning network, and thus (i-2) output each piece of (1_1)-st characteristic information for training to (1_n)-th characteristic information for training on the augmented obfuscated training data, (ii) a process of inputting the training data into each of the first learning network to the n-th learning network, to thereby allow each of the first learning network to the n-th learning network to (ii-1) apply its corresponding learning operation to the training data by using respectively the first learned parameters to the n-th learned parameters, and thus (ii-2) output each piece of (2_1)-st characteristic information for training to (2_n)-th characteristic information for training on the training data, and (iii) a process of training the obfuscation network such that the first error is minimized which is an average over (iii-1) the (1_1)-st error acquired by referring to the (1_1)-st characteristic information for training and the (2_1)-st characteristic information for training to (iii-2) the (1_n)-th error acquired by referring to the (1_n)-th characteristic information for training and the (2_n)-th characteristic information for training and such that the second error which is the obfuscated training data score, corresponding to the obfuscated training data inputted into the discriminator or the augmented obfuscated training data inputted into the discriminator, is maximized and (iv) a process of training the discriminator such that the training data score, corresponding to the modified training data inputted into the discriminator or the modified obfuscated training data inputted into the discriminator, is maximized and such that the obfuscated training data score is minimized.

In addition, recordable media that are readable by a computer for storing a computer program to execute the method of the present disclosure are further provided.

BRIEF DESCRIPTION OF THE DRAWINGS

The following drawings to be used for explaining example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
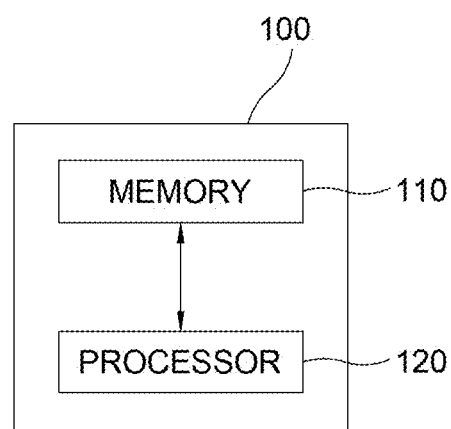
FIG. 1 is a drawing schematically illustrating a learning device for training an obfuscation network capable of obfuscating, e.g., anonymizing or concealing, original data in accordance with one example embodiment of the present disclosure.

In the following detailed description, reference is made to the accompanying drawings that show, by way of illustration, specific embodiments in which the present disclosure may be practiced. These embodiments are described in sufficient detail to enable those skilled in the art to practice the present disclosure. It is to be understood that the various embodiments of the present disclosure, although different, are not necessarily mutually exclusive. For example, a particular feature, structure, or characteristic described herein may be implemented as being changed from an embodiment to other embodiments without departing from the spirit and scope of the present disclosure. In addition, it is to be understood that the position or arrangement of individual elements within each embodiment may be modified without departing from the spirit and scope of the present disclosure. The following detailed description is, therefore, not to be taken in a limiting sense, and the scope of the present disclosure is described as including the appended claims, along with the full range of equivalents to which the claims are entitled. In the drawings, like numerals refer to the same or similar components throughout the several aspects.

To allow those skilled in the art to carry out the present disclosure easily, the example embodiments of the present disclosure will be explained in detail as shown below by referring to attached drawings.

FIG. 1 is a drawing schematically illustrating a learning device for training an obfuscation network capable of obfuscating, e.g., anonymizing or concealing, original data in accordance with one example embodiment of the present disclosure.

By referring to FIG. 1, the learning device 100 in accordance with one example embodiment of the present disclosure may include a memory 110 for storing instructions to train the obfuscation network capable of obfuscating, e.g., anonymizing, training data such that a learning network outputs a result, generated by inputting obfuscated training data into the learning network, same as or similar to a result, generated by inputting the training data into the learning network, and a processor 120 for performing processes to train the obfuscation network according to the instructions in the memory 110.

Specifically, the learning device 100 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

Also, the processors of such devices may include hardware configuration of MPU (Micro Processing Unit) or CPU (Central Processing Unit), cache memory, data bus, etc. Additionally, the computing device may further include operating system (OS) and software configuration of applications that achieve specific purposes.

Such description of the computing device does not exclude an integrated device including any combination of a processor, a memory, a medium, or any other computing components for implementing the present disclosure.

Meanwhile, if the training data is acquired, the processor 120 of the learning device 100 may, according to the instructions stored in the memory 110, input the training data into the obfuscation network, to thereby allow the obfuscation network to obfuscate the training data and thus to generate the obfuscated training data. And, the learning device 100 may input the obfuscated training data into an augmentation network, to thereby allow the augmentation network to augment the obfuscated training data and thus to generate augmented obfuscated training data. Herein, the augmented obfuscated training data will be described with examples of augmentation later. Next, the learning device 100 may perform or support another device to perform (i) a process of inputting the augmented obfuscated training data into a learning network having one or more learned parameters, to thereby allow the learning network to (i-1) apply a learning operation to the augmented obfuscated training data by using the learned parameters and thus (i-2) generate first characteristic information for training corresponding to the augmented obfuscated training data and (ii) a process of inputting the training data into the learning network, to thereby allow the learning network to (ii-1) apply the learning operation to the training data by using the learned parameters and thus (ii-2) generate second characteristic information for training corresponding to the training data. Thereafter, the learning device 100 may perform or support another device to perform a process of training the obfuscation network such that at least one first error, which is calculated by referring to at least part of (i) at least one (1_1)-st error acquired by referring to the first characteristic information for training and the second characteristic information for training and (ii) at least one (1_2)-nd error acquired by referring to (ii-1) at least one task specific output generated by using the first characteristic information for training and (ii-2) at least one ground truth corresponding to the task specific output, is minimized and such that at least one second error, which is calculated by referring to (i) (i-1) modified training data, created by modifying the training data, or modified obfuscated training data, created by modifying the obfuscated training data, and (i-2) the obfuscated training data or (ii) (ii-1) the modified training data or the modified obfuscated training data and (ii-2) the augmented obfuscated training data, is maximized.

Also, on condition that an obfuscated training data score, corresponding to the obfuscated training data inputted into a discriminator capable of determining whether its inputted data is real or fake or the augmented obfuscated training data inputted into the discriminator, has been acquired as the second error, the learning device 100 may perform or support another device to perform a process of training the obfuscation network such that the first error is minimized and the second error is maximized and a process of training the discriminator such that a training data score, corresponding to the modified training data inputted into the discriminator or the modified obfuscated training data inputted into the discriminator, is maximized and such that the obfuscated training data score is minimized. Herein, the discriminator may generate the obfuscated training data score representing whether its inputted data, i.e., the obfuscated training data or the augmented obfuscated training data, is real or fake. Further, the discriminator may also generate the training data score representing whether its inputted data, i.e., the modified training data or the modified obfuscated training data, is real or fake.

A method for training the obfuscation network capable of obfuscating, e.g., anonymizing or concealing, the original data to protect personal information by using the learning device 100 in accordance with one example embodiment of the present disclosure is described by referring to FIGS. 2 to 5 as follows.

Figure 2:
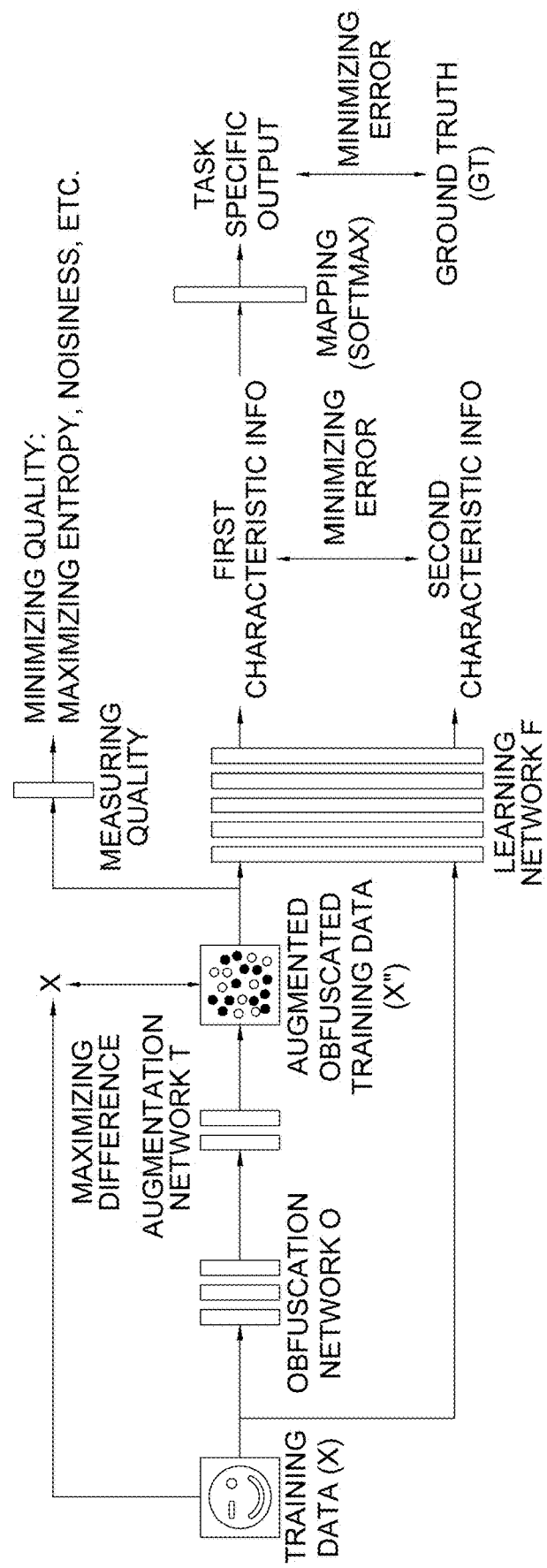
FIG. 2 is a drawing schematically illustrating a method for training the obfuscation network capable of obfuscating, e.g., anonymizing or concealing, the original data in accordance with one example embodiment of the present disclosure.

FIG. 2 is a drawing schematically illustrating a method for training the obfuscation network capable of obfuscating, e.g., anonymizing or concealing, the original data in accordance with one example embodiment of the present disclosure.

First, if the training data x is acquired, the learning device 100 may input the training data x into the obfuscation network O, to thereby allow the obfuscation network O to obfuscate the training data x and thus to generate the obfuscated training data x', i.e., O(x).

Herein, the obfuscated training data x' may be recognized as data different from the training data x by a human, but may be recognized as data similar to or same as the training data x by the learning network.

Meanwhile, as one example, the obfuscation network O may include an encoder having one or more convolutional layers for applying one or more convolution operations to images inputted as the training data x, and a decoder having one or more deconvolutional layers for applying one or more deconvolution operations to at least one feature map outputted from the encoder and for generating the obfuscated training data x', but the scope of the present disclosure is not limited thereto, and may include any learning networks having various structures capable of obfuscating the inputted training data.

Next, the learning device 100 may input the obfuscated training data x' into the augmentation network T, to thereby allow the augmentation network T to augment the obfuscated training data x' and thus to generate the augmented obfuscated training data x".

Herein, the augmentation network T may be used for allowing the obfuscation network O to obfuscate, e.g., to conceal or anonymize, the original data by supporting the augmentation such as flip, rotation, resizing, color-change, noise addition, etc. during the processes of training the obfuscation network O.

For example, if the learning network is configured as a convolutional neural network (CNN), the CNN recognizes an object in an image with consistency regardless of a position of the object in the image due to translation invariance. Thus, a result O(crop(x)) created by cropping a specific part of an image and then by obfuscating the cropped specific part of the image and a result crop(O(x)) created by obfuscating the specific part of the image and then cropping the obfuscated specific part of the image are recognized as almost the same by the CNN, therefore, the obfuscation network O may be considered as supporting random-crop augmentation.

However, the CNN recognizes a first object and a second object whose orientations and proportions are different as different objects although the first object and the second object are a same object. Therefore, in order to allow the obfuscation network O to support the augmentation like flip, rotation, resizing, color-change, noise addition, etc., the obfuscation network O may be trained to obfuscate the input data with the augmentation such that a result O(T(x)) created by augmenting input data and then by obfuscating the augmented input data and a result T(O(x)) created by obfuscating the input data and then by augmenting the obfuscated input data are recognized as same or similar by the learning network. Next, the learning device 100 may perform or support another device to perform (i) a process of inputting the augmented obfuscated training data x" into the learning network F having the learned parameters, to thereby allow the learning network F to (i-1) apply the learning operation to the augmented obfuscated training data x" by using the learned parameters and thus (i-2) generate first characteristic information F(x") corresponding to the augmented obfuscated training data x" and (ii) a process of inputting the training data x into the learning network F, to thereby allow the learning network F to (ii-1) apply the learning operation to the training data x by using the learned parameters and thus (ii-2) generate second characteristic information F(x) corresponding to the training data x.

Herein, the learning network F may include a machine learning network, but the scope of the present disclosure is not limited thereto, and may include any learning networks capable of using their respective learned parameters, generating the first characteristic information F(x") by applying the learning operation to the augmented obfuscated training data x", and generating the second characteristic information F(x) by applying the learning operation to the training data x. And, the machine learning network may include at least one of a k-Nearest Neighbors, a Linear Regression, a Logistic Regression, a Support Vector Machine (SVM), a Decision Tree and Random Forest, a Neural Network, a Clustering, a Visualization and a Dimensionality Reduction, an Association Rule Learning, a Deep Belief Network, a Reinforcement Learning, and a Deep learning algorithm, but the machine learning network is not limited thereto and may include various learning algorithms. Also, a subject to be obfuscated, e.g., a subject to be anonymized or concealed, may be personal information included in the original data, i.e., the training data x. Herein, the personal information may include any information related to a person, such as personal identification information, personal medical information, personal biometric information, personal behavioral information, etc.

And, the first characteristic information F(x") and the second characteristic information F(x) may be features or logits respectively corresponding to the augmented obfuscated training data x" and the training data x. Also, the first characteristic information F(x") and the second characteristic information F(x) may be feature values related to certain features respectively in the augmented obfuscated training data x" and the training data x, or the logits including values related to at least one of vectors, matrices, and coordinates related to the certain features. For example, if the training data x are facial image data, the result above may be classes for face recognition, facial features, e.g., laughing expressions, coordinates of facial landmark points, e.g., both end points on far sides of an eye.

Next, the learning device 100 may perform or support another device to perform a process of training the obfuscation network O such that the first error, which is calculated by referring to at least part of (i) the (1_1)-st error acquired by referring to the first characteristic information F(x") and the second characteristic information F(x) and (ii) the (1_2)-nd error acquired by referring to (ii-1) the task specific output generated by using the first characteristic information and (ii-2) the ground truth corresponding to the task specific output, is minimized and such that the second error, which is calculated by referring to (i) (i-1) the modified training data, created by modifying the training data, or the modified obfuscated training data, created by modifying the obfuscated training data, and (i-2) the obfuscated training data x' or (ii) (ii-1) the modified training data or the modified obfuscated training data and (ii-2) the augmented obfuscated training data x", is maximized. That is, the learning device 100 may train the obfuscation network O, (i) by using the second error, such that the obfuscation network O outputs the obfuscated training data x' much different from the training data x and (ii) by using the first error, such that the obfuscation network O obfuscates the training data to output the obfuscated training data x', in order to allow the learning network F to recognize the obfuscated training data x' as same as or similar to the training data x. Also, the obfuscation network O may be trained to obfuscate the training data x, to thereby generate the obfuscated training data x' such that an object detector recognizes an object with consistency even from the obfuscated training data x' to which the augmentation is applied.

Herein, the learning device 100 may acquire the first error by referring to at least part of (1) a difference between the first characteristic information F(x") and the second characteristic information F(x) and (2) a difference between the task specific output and its corresponding ground truth. As one example, the learning device 100 may acquire the first error by referring to a norm or a cosine similarity between the first characteristic information F(x") and the second characteristic information F(x), but the scope of the present disclosure is not limited thereto, and any various algorithms capable of calculating a difference between the first characteristic information F(x") and the second characteristic information F(x) may be adopted. Also, the learning device 100 may perform or support another device to perform a process of calculating the second error by referring to (1) a difference between (1-a) the modified training data or the modified obfuscated training data and (1-b) the obfuscated training data x' or (2) a difference between (2-a) the modified training data or the modified obfuscated training data and (2-b) the augmented obfuscated training data x".

Herein, the modified training data or the modified obfuscated training data may be respectively generated by adding at least one random noise, created through the random noise generating network (not illustrated), to the training data or the obfuscated training data. As one example, the random noise generating network may be instructed to generate the random noise having the normal distribution N(0, σ), and the generated noise may be added to the training data or the obfuscated training data, to thereby generate the modified training data or the modified obfuscated training data. As another example, the modified training data or the modified obfuscated training data may be respectively generated by blurring the training data or the obfuscated training data, or changing a resolution of the training data or the obfuscated training data, as well as adding the random noise, but the scope of the present disclosure is not limited thereto, and various ways of modifying the training data or the obfuscated training data may be used.

Also, the learning device 100 may measure at least one quality by referring to at least part of an entropy of the augmented obfuscated training data x" and a degree of noise of the augmented obfuscated training data x", and may acquire the first error by further referring to the measured quality. That is, the learning device 100 may train the obfuscation network O such that the quality of the augmented obfuscated training data x" is minimized, for example, such that the entropy, noise, etc. of the augmented obfuscated training data x" are maximized.

And, if the learning device 100 trains the obfuscation network O such that the first error is minimized and that the second error is maximized, the learning device 100 may fix and not update the learned parameters of the learning network F, and may proceed with training the obfuscation network O only.

Meanwhile, the task specific output may be an output of a task to be performed by the learning network F, and may have various results according to the task learned by the learning network F, such as a probability of a class for classification, coordinates resulting from regression for location detection, etc., and an activation function of an activation unit may be applied to characteristic information outputted from the learning network F, to thereby generate the task specific output according to the task to be performed by the learning network F. Herein, the activation function may include a sigmoid function, a linear function, a softmax function, an rlinear function, a square function, a sqrt function, an srlinear function, an abs function, a tan h function, a brlinear function, etc. but the scope of the present disclosure is not limited thereto.

As one example, when the learning network F performs the task for the classification, the learning device 100 may map the first characteristic information outputted from the learning network F onto each of classes, to thereby generate one or more probabilities of the augmented obfuscated training data, for each of the classes. Herein, the probabilities for each of the classes may represent probabilities of the first characteristic information F(x"), outputted for each of the classes from the learning network F, being correct. For example, if the training data are the facial image data, a probability of the face having a laughing expression may be outputted as 0.75, and a probability of the face not having the laughing expression may be outputted as 0.25, and the like. Herein, a softmax algorithm may be used for mapping the first characteristic information F(x") outputted from the learning network F onto each of the classes, but the scope of the present disclosure is not limited thereto, and various algorithms may be used for mapping the first characteristic information F(x") onto each of the classes.

And, since the obfuscation network O is updated by using a gradient created from a final loss when the obfuscation network O is trained with the first error by the learning device 100, the augmentation network T may be described by a differentiable function. Herein, the final loss may be calculated by referring to the first error. If the augmentation network T cannot be described by any differentiable function, a differentiable function, e.g., a neural network, etc., capable of approximating the augmentation network T may be set as the augmentation network T.

That is, during the processes of backpropagation for training the obfuscation network O, the gradient backpropagated to the augmentation network T may be transformed by a function of the augmentation network T, and the transformed gradient may be transmitted to the obfuscation network O, to thereby train the obfuscation network O.

Figure 3:
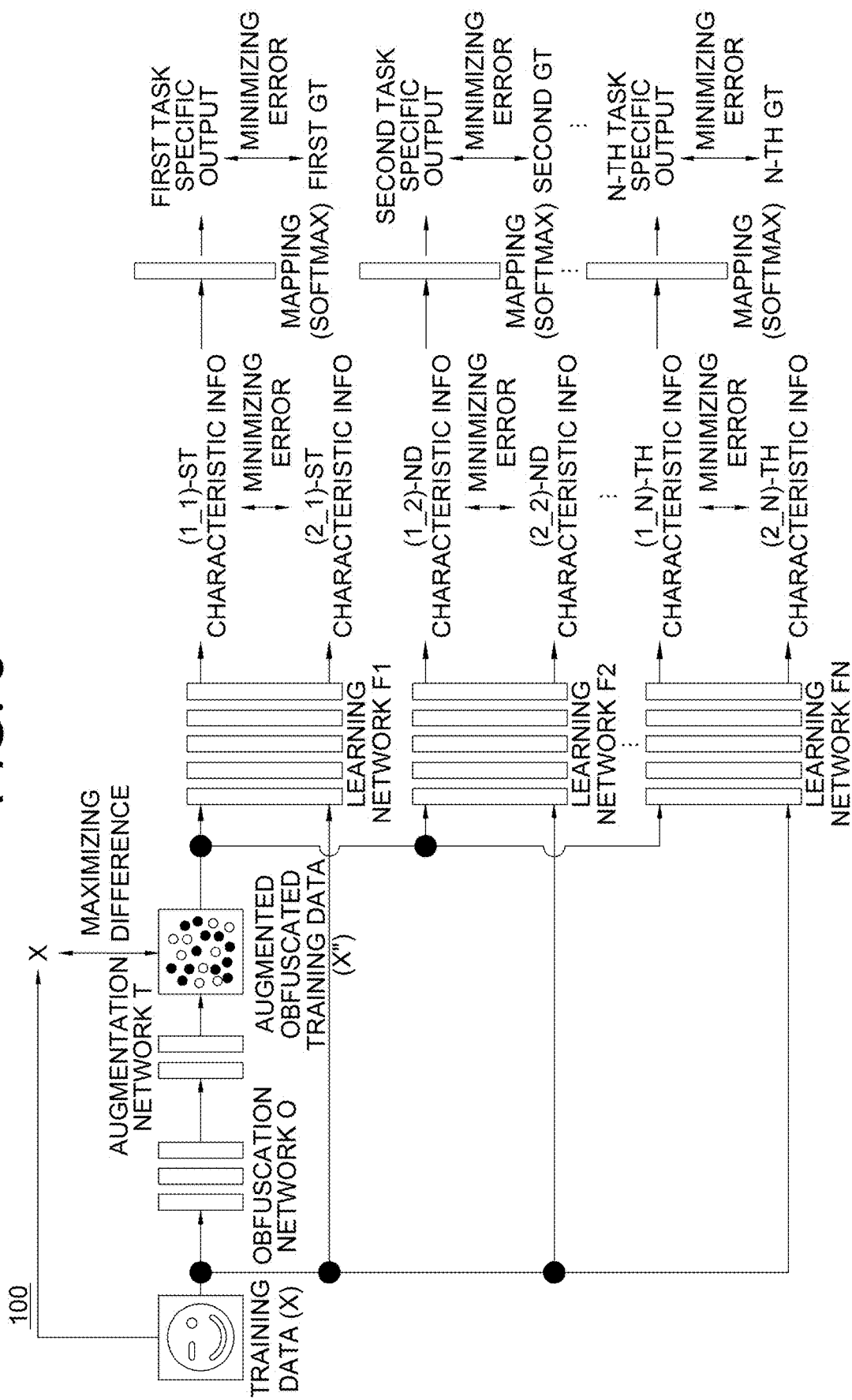
FIG. 3 is a drawing schematically illustrating another method for training the obfuscation network capable of obfuscating, e.g., anonymizing or concealing, the original data in accordance with one example embodiment of the present disclosure.

FIG. 3 is a drawing schematically illustrating another method for training the obfuscation network capable of obfuscating, e.g., anonymizing or concealing, the original data in accordance with one example embodiment of the present disclosure. Herein, the learning network F in FIG. 2 is configured as multiple learning networks F1, F2, . . . , and Fn having one or more respective learned parameters. Further, each of the multiple learning networks F1, F2, and Fn may have completed learning to perform tasks at least part of which may be different from one another. In the description below, the part easily deducible from the explanation of FIG. 2 will be omitted.

First, if the training data x is acquired, the learning device 100 may input the training data x into the obfuscation network O, to thereby allow the obfuscation network O to obfuscate the training data x and thus to generate the obfuscated training data x', i.e., O(x).

Herein, the obfuscated training data x' may be recognized as data different from the training data x by a human, but may be recognized as data similar to or same as the training data x by the learning network.

Next, the learning device 100 may input the obfuscated training data x' into the augmentation network T, to thereby allow the augmentation network T to augment the obfuscated training data x' and thus to generate the augmented obfuscated training data x".

Herein, the augmentation network T may be used for allowing the obfuscation network O to support the augmentation during the processes of training the obfuscation network O.

As one example, the augmentation network T may apply a function such as flip, rotation, resizing, color-change, noise addition, etc. to the obfuscated training data x', to thereby transform the obfuscated training data x' into the augmented obfuscated training data x". Next, the learning device 100 may input the augmented obfuscated training data x" into each of the first learning network F1 to the n-th learning network Fn, to thereby allow each of the first learning network F1 to the n-th learning network Fn to (i) apply its corresponding learning operation to the augmented obfuscated training data x" by using respectively the first learned parameters to the n-th learned parameters of the first learning network F to the n-th learning network Fn, and thus (ii) generate each piece of (1_1)-st characteristic information F1(x") to (1_n)-th characteristic information Fn(x") corresponding to the augmented obfuscated training data x". Also, the learning device 100 may input the training data x into each of the first learning network F to the n-th learning network Fn, to thereby allow each of the first learning network F to the n-th learning network Fn to (i) apply its corresponding learning operation to the training data x by using respectively the first learned parameters to the n-th learned parameters of the first learning network F1 to the n-th learning network Fn, and thus (ii) generate each piece of (2_1)-st characteristic information F1(x) to (2_n)-th characteristic information Fn(x) corresponding to the training data x.

Next, the learning device 100 may train the obfuscation network O such that the first error is minimized which is calculated by referring to at least part of (i) the (1_1)-st error which is an average over (i-1) a (1_1)_1st error, acquired by referring to the (1_1)-st characteristic information F1(x") and the (2_1)-st characteristic information F1(x), to (i-2) a (1_1)_n-th error acquired by referring to the (1_n)-th characteristic information Fn(x") and the (2_n)-th characteristic information Fn(x) and (ii) the (1_2)-nd error which is an average over (ii-1) a (1_2)_1st error acquired by referring to (ii-1-a) at least one first task specific output created by using the (1_1)-st characteristic information F1(x") and (ii-1-b) at least one first ground truth corresponding to the first task specific output to (ii-2) a (1_2)_n-th error acquired by referring to (ii-2-a) at least one n-th task specific output created by using the (1_n)-th characteristic information Fn(x") and (ii-2-b) at least one n-th ground truth corresponding to the n-th task specific output and such that the second error is maximized which is calculated by referring to (i) (i-1) the modified training data or the modified obfuscated training data and (i-2) the obfuscated training data x' or (ii) (ii-1) the modified training data or the modified obfuscated training data and (ii-2) the augmented obfuscated training data x".

That is, the learning device 100 may (i) acquire the (1_1)_1st error calculated by referring to the (1_1)-st characteristic information F1(x") and the (2_1)-st characteristic information F1(x), (ii) acquire the (11)_2nd error calculated by referring to the (1_2)-nd characteristic information F2(x") and the (2 2)-nd characteristic information F2(x), and similarly, (iii) acquire the (1_1)_n-th error calculated by referring to the (1_n)-th characteristic information Fn(x") and the (2_n)-th characteristic information Fn(x), and thus (iv) acquire the (1_1)-st error which is an average over the acquired (1_1)_1st error to the acquired (1_1)_n-th error. Then, the learning device 100 may acquire (i) the (1_2)_1st error calculated by referring to (i-1) the first task specific output created by using the (1_1)-st characteristic information F1(x") and (i-2) the first ground truth corresponding to the first task specific output to (ii) the (1_2)_n-th error calculated by referring to (ii-1) the n-th task specific output created by using the (1_n)-th characteristic information Fn(x") and (ii-2) the n-th ground truth corresponding to the n-th task specific output, and thus, acquire the (1_2)-nd error which is an average over the acquired (1_2)_1st error to the (1_2)_n-th error. And, the learning device 100 may train the obfuscation network O such that the first error, which is calculated by referring to at least part of the (1-1)-st error and the (1-2)-nd error, is minimized and such that the second error is maximized. That is, the first error may be one of the (1_1)-st error, the (1_2)-nd error, and a sum of the (1_1)-st error and the (1_2)-nd error, but the scope of the present disclosure is not limited thereto.

Also, the learning device 100 may measure at least one quality by referring to at least part of an entropy of the augmented obfuscated training data x" and a degree of noise of the augmented obfuscated training data x", and may acquire the first error by further referring to the measured quality. That is, the learning device 100 may train the obfuscation network O such that the quality of the augmented obfuscated training data x" is minimized, for example, such that the entropy, noise, etc. of the augmented obfuscated training data x" are maximized.

And, if the learning device 100 trains the obfuscation network O such that the first error is minimized and that the second error is maximized, the learning device 100 may fix and not update the learned parameters of the learning network F, and may proceed with training the obfuscation network O only.

Meanwhile, in the above description, the learning device 100 may train the obfuscation network O such that the first error is minimized which is calculated by referring to at least part of (i) the (1_1)-st error which is an average over (i-1) the (1_1)_1st error acquired by referring to the (1_1)-st characteristic information $F1(x")$ and the (2_1)-st characteristic information $F1(x)$ to (i-2) the (1_1)_n-th error acquired by referring to the (1_n)-th characteristic information $Fn(x")$ and the (2-n)-th characteristic information $Fn(x)$ and (ii) the (1-2)-nd error which is an average over (ii-1) the (1_2)_1st error acquired by referring to (ii-1-a) the first task specific output created by using the (1_1)-st characteristic information $F1(x")$ and (ii-1-b) the first ground truth corresponding to the first task specific output to (ii-2) the (1_2)_n-th error acquired by referring to (ii-2-a) the n-th task specific output created by using the (1_n)-th characteristic information and (ii-2-b) the n-th ground truth corresponding to the n-th task specific output and such that the second error is maximized which is calculated by referring to (i) (i-1) the modified training data or the modified obfuscated training data and (i-2) the obfuscated training data or (ii) (ii-2) the modified training data or the modified obfuscated training data and (ii-2) the augmented obfuscated training data. However, as another example, the obfuscation network O may be sequentially trained such that (i) the (1_1)-st error, calculated by referring to at least part of the (1_1)_1st error and the (1_2)_1st error, to (ii) the (1_n)-th error, calculated by referring to at least part of the (1_1)_n-th error and the (1_2)_n-th error, are minimized.

That is, the learning device 100 may perform or support another device to perform a process of inputting the training data x into the obfuscation network O, to thereby allow the obfuscation network O to obfuscate the training data x and thus to generate first obfuscated training data x1' and a process of inputting the first obfuscated training data x1' into the augmentation network T, to thereby allow the augmentation network T to augment the first obfuscated training data x1' and thus to generate first augmented obfuscated training data x1". And, the learning device 100 may perform or support another device to perform (i) a process of inputting the first augmented obfuscated training data x1" into the first learning network F1, to thereby allow the first learning network F1 to (i-1) apply the learning operation to the first augmented obfuscated training data x1" by using the first learned parameters of the first learning network F1 and thus (i-2) output the (1_1)-st characteristic information $F1(x1")$ corresponding to the first augmented obfuscated training data x1", and (ii) a process of inputting the training data x into the first learning network F1, to thereby allow the first learning network F1 to (ii-1) apply the learning operation to the training data x by using the first learned parameters and thus (ii-2) output the (2_1)-st characteristic information $F1(x)$ corresponding to the training data x. Thereafter, the learning device 100 may perform or support another device to perform a process of training the obfuscation network O such that the (1_1)-st error is minimized which is calculated by referring to at least part of (i) the (1_1)_1st error acquired by referring to the (1-1)-st characteristic information $F1(x1")$ and the (2-1)-st characteristic information $F1(x)$ and (ii) the (1_2)_1st error acquired by referring to (ii-1) the first task specific output generated by using the (1_1)-st characteristic information $F1(x")$ and (ii-2) the first ground truth corresponding to the first task specific output and such that the (2_1)-st error is maximized which is calculated by referring to (i) (i-1) the modified training data or the first modified obfuscated training data and (i-2) the first obfuscated training data x1' or (ii) (ii-1) the modified training data or the first modified obfuscated training data and (ii-2) the first augmented obfuscated training data x1", to thereby allow the obfuscation network O to be a first trained obfuscation network O1. Herein, the first modified obfuscated training data may be created by modifying the first obfuscated training data.

And, while increasing an integer k from 2 to n, the learning device 100 may repeat the processes above up to the n-th learning network Fn, to thereby acquire an n-th obfuscation network On.

That is, the learning device 100 may perform or support another device to perform (i) a process of inputting the training data x into a (k−1)-th trained obfuscation network O(k−1), to thereby allow the (k−1)-th trained obfuscation network O(k−1) to obfuscate the training data x and thus to generate k-th obfuscated training data xk' and (ii) a process of inputting the k-th obfuscated training data xk' into the augmentation network T, to thereby allow the augmentation network T to augment the k-th obfuscated training data xk' and thus to generate k-th augmented obfuscated training data xk". And, the learning device 100 may perform or support another device to perform (i) a process of inputting the k-th augmented obfuscated training data xk" into the k-th learning network Fk, to thereby allow the k-th learning network Fk to apply the learning operation to the k-th augmented obfuscated training data xk" by using the k-th learned parameters of the k-th learning network Fk and thus to output (1_k)-th characteristic information $Fk(xk")$ corresponding to the k-th augmented obfuscated training data xk", and (ii) a process of inputting the training data x into the k-th learning network Fk, to thereby allow the k-th learning network Fk to apply the learning operation to the training data x by using the k-th learned parameters and thus to output (2_k)-th characteristic information $Fk(xk)$ corresponding to the training data x. Thereafter, the learning device 100 may perform or support another device to perform a process of training the (k−1)-th trained obfuscation network O(k−1) such that the (1_k)-th error is minimized which is calculated by referring to at least part of (i) the (1_1)_k-th error acquired by referring to the (1_k)-th characteristic information $Fk(xk")$ and the (2_k)-th characteristic information $Fk(x)$ and (ii) the (1_2)_k-th error acquired by referring to (ii-1) the k-th task specific output generated by using the (1_k)-th characteristic information and (ii-2) the k-th ground truth corresponding to the k-th task specific output and such that the (2_k)-th error is maximized which is calculated by referring to (i) (i-1) the modified training data or the k-th modified obfuscated training data and (i-2) the k-th obfuscated training data xk' or (ii) (ii-1) the modified training data or the k-th modified obfuscated training data and (ii-2) the k-th augmented obfuscated training data xk", to thereby allow the (k−1)-th trained obfuscation network O(k−1) to be a k-th trained obfuscation network Ok.

Figure 4:
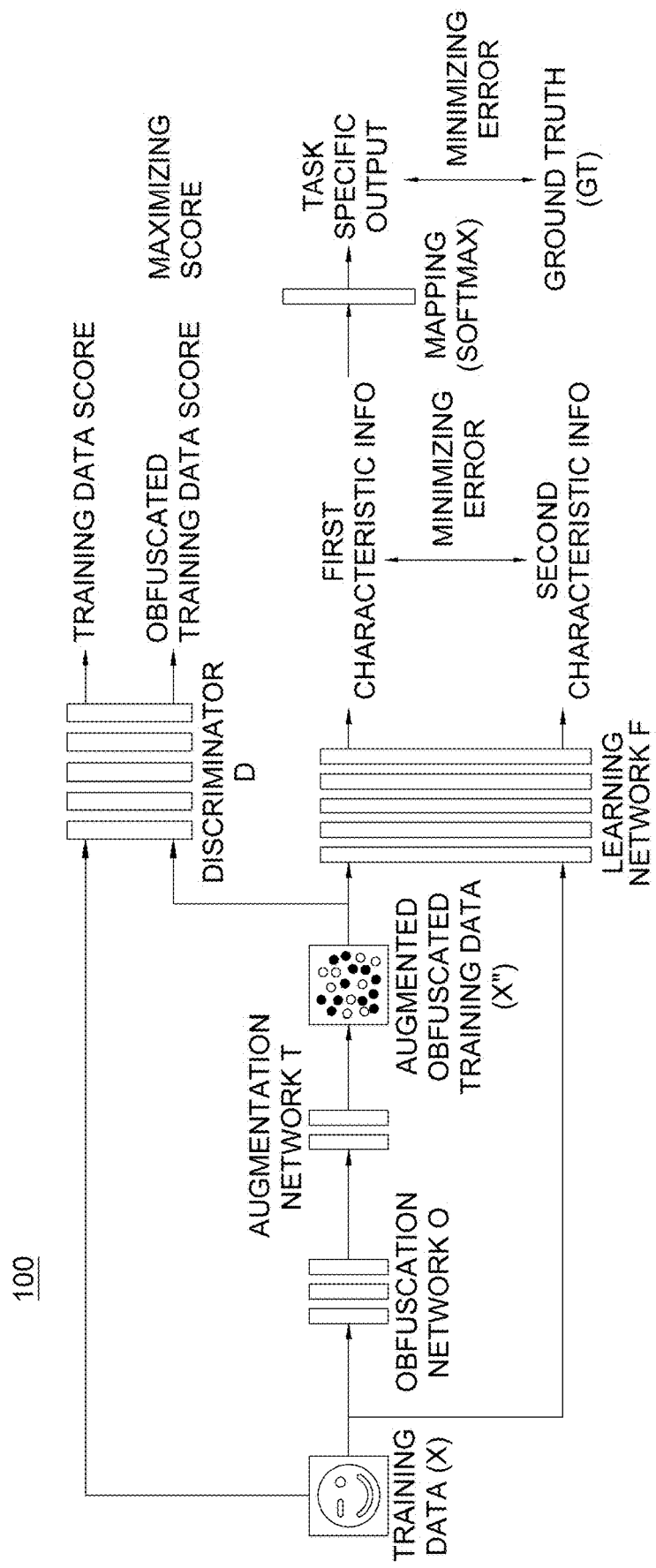
FIG. 4 is a drawing schematically illustrating a method for training the obfuscation network capable of obfuscating, e.g., anonymizing or concealing, the original data in accordance with another example embodiment of the present disclosure.

FIG. 4 is a drawing schematically illustrating a method for training the obfuscation network capable of obfuscating, e.g., anonymizing or concealing, the original data in accordance with another example embodiment of the present disclosure. In the description below, the part easily deducible from the explanation of FIGS. 2 and 3 will be omitted.

First, if the training data x is acquired, the learning device 100 may input the training data x into the obfuscation network O, to thereby allow the obfuscation network O to obfuscate the training data x and thus to generate the obfuscated training data x', i.e., O(x).

Next, the learning device 100 may input the obfuscated training data x' into the augmentation network T, to thereby allow the augmentation network T to augment the obfuscated training data x' and thus to generate the augmented obfuscated training data x".

Next, the learning device 100 may perform or support another device to perform (i) a process of inputting the augmented obfuscated training data x" into the learning network F having the learned parameters, to thereby allow the learning network F to (i-1) apply the learning operation to the augmented obfuscated training data x" by using the learned parameters and thus (i-2) generate first characteristic information F(x") corresponding to the augmented obfuscated training data x" and (ii) a process of inputting the training data x into the learning network F, to thereby allow the learning network F to (ii-1) apply the learning operation to the training data x by using the learned parameters and thus (ii-2) generate second characteristic information F(x) corresponding to the training data x.

Next, on condition that an obfuscated training data score, corresponding to the obfuscated training data inputted into a discriminator D capable of determining whether its inputted data is real or fake or the augmented obfuscated training data x" inputted into the discriminator D, has been acquired as the second error, the learning device 100 may perform or support another device to perform (i) a process of training the obfuscation network O such that the first error is minimized and the second error, i.e., the obfuscated training data score, is maximized and (ii) a process of training the discriminator D such that a training data score, corresponding to the modified training data inputted into the discriminator D or the modified obfuscated training data inputted into the discriminator D, is maximized and such that the obfuscated training data score is minimized.

That is, the learning device 100 may train the obfuscation network O, (i) by using the first error, such that the obfuscation network O obfuscates the training data x to output the obfuscated training data x' in order to allow the obfuscated training data x' to be recognized by the learning network F as same as or similar to the training data x, and (ii) by using the second error, such that the obfuscation network O obfuscates the training data x to output the obfuscated training data x' in order to allow the obfuscated training data x', which is different from the training data x, to be difficult to differentiate from the training data x and such that the obfuscation network O supports the augmentation.

Herein, a maximum of the training data score, corresponding to the modified training data inputted into the discriminator D or the modified obfuscated training data inputted into the discriminator D, may be 1 as a value for determining the modified training data or the modified obfuscated training data as real. And a minimum of the obfuscated training data score, corresponding to the obfuscated training data inputted into the discriminator D or the augmented obfuscated training data x" inputted into the discriminator D, may be O as a value for determining the obfuscated training data or the augmented obfuscated training data x" as fake. That is, the discriminator D may be trained to recognize the obfuscated training data or the augmented obfuscated training data x" as the modified training data or the modified obfuscated training data.

Figure 5:
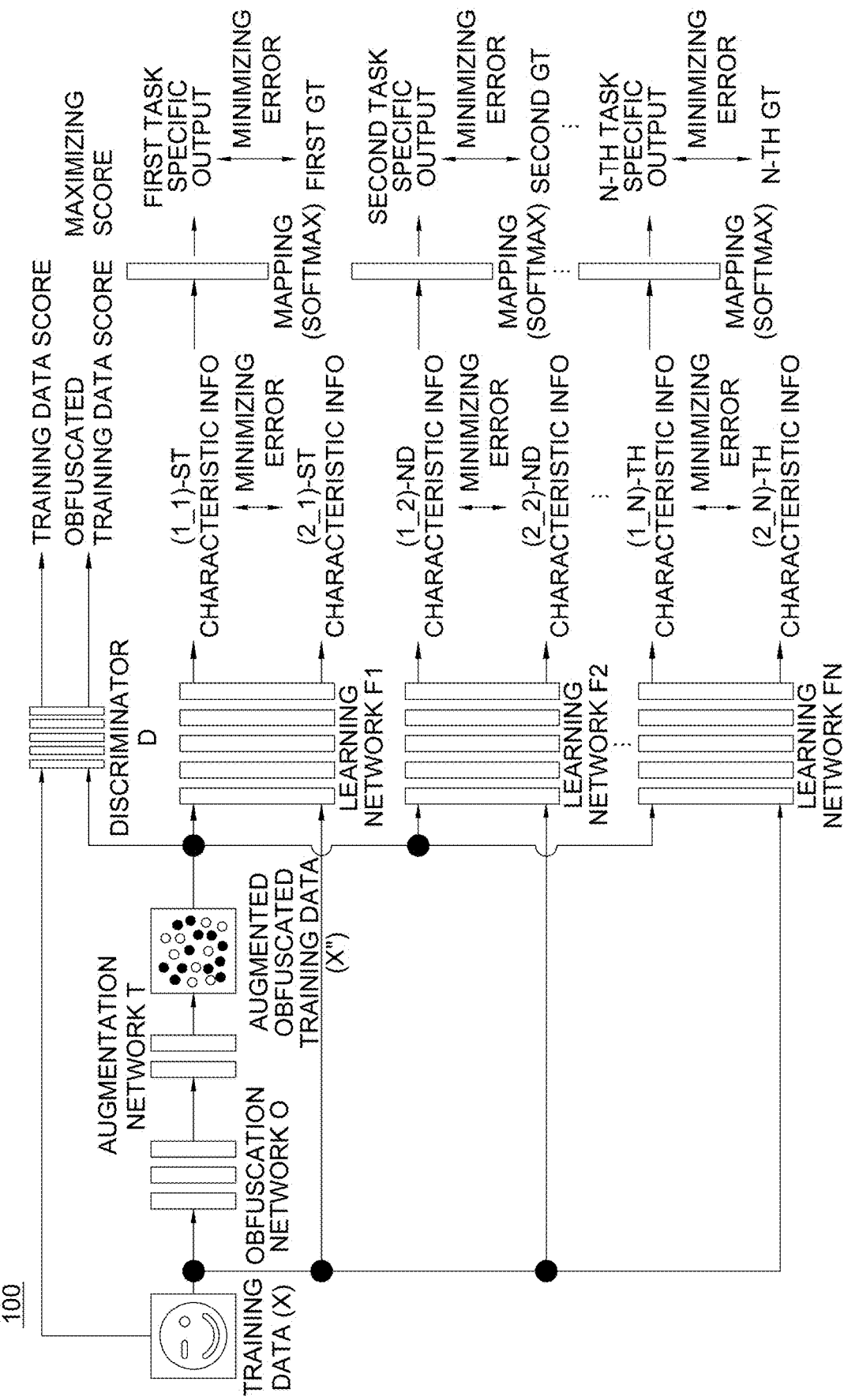
FIG. 5 is a drawing schematically illustrating another method for training the obfuscation network capable of obfuscating, e.g., anonymizing or concealing, the original data in accordance with another example embodiment of the present disclosure.

FIG. 5 is a drawing schematically illustrating another method for training the obfuscation network capable of obfuscating, e.g., anonymizing or concealing, the original data in accordance with another example embodiment of the present disclosure. Herein, the learning network F in FIG. 4 is configured as multiple learning networks F1, F2, . . . , and Fn having one or more respective learned parameters. In the description below, the part easily deducible from the explanation of FIGS. 2 to 4 will be omitted.

First, if the training data x is acquired, the learning device 100 may input the training data x into the obfuscation network O, to thereby allow the obfuscation network O to obfuscate the training data x and thus to generate the obfuscated training data x', i.e., O(x).

Next, the learning device 100 may input the obfuscated training data x' into the augmentation network T, to thereby allow the augmentation network T to augment the obfuscated training data x' and thus to generate the augmented obfuscated training data x".

Next, the learning device 100 may input the augmented obfuscated training data x" into each of the first learning network F1 to the n-th learning network Fn, to thereby allow each of the first learning network F1 to the n-th learning network Fn to (i) apply its corresponding learning operation to the augmented obfuscated training data x" by using respectively the first learned parameters to the n-th learned parameters of the first learning network F1 to the n-th learning network Fn, and thus (ii) generate each piece of (1_1)-st characteristic information $F1(x")$ to (1_n)-th characteristic information Fn(x") corresponding to the augmented obfuscated training data x". Also, the learning device 100 may input the training data x into each of the first learning network F1 to the n-th learning network Fn, to thereby allow each of the first learning network F1 to the n-th learning network Fn to (i) apply its corresponding learning operation to the training data x by using respectively the first learned parameters to the n-th learned parameters of the first learning network F1 to the n-th learning network Fn, and thus (ii) generate each piece of (2_1)-st characteristic information $F1(x)$ to (2_n)-th characteristic information Fn(x) corresponding to the training data x.

Next, the learning device 100 may perform or support another device to perform a process of training the obfuscation network O such that the first error is minimized which is calculated by referring to at least part of (i) a (1_1)-st error which is an average over (i-1) a (1_1)_1st error acquired by referring to the (1_1)-st characteristic information $F1(x")$ and the (2_1)-st characteristic information $F1(x)$ to (i-2) a (1_1)_n-th error acquired by referring to the (1-n)-th characteristic information Fn(x") and the (2-n)-th characteristic information Fn(x) and (ii) a (1_2)-nd error which is an average over (ii-1) a (1_2)_1st error acquired by referring to (ii-1-a) a first task specific output created by using the (1_1)-st characteristic information $F1(x")$ and (ii-1-b) the first ground truth corresponding to the first task specific output to (ii-2) a (1_2)_n-th error acquired by referring to (ii-2-a) an n-th task specific output created by using the (1_n)-th characteristic information Fn(x") and (ii-2-b) the n-th ground truth corresponding to the n-th task specific output and such that the second error is maximized which is the obfuscated training data score corresponding to the obfuscated training data inputted into the discriminator D or the augmented obfuscated training data x" inputted into the discriminator D. And the learning device 100 may perform or support another device to perform a process of training the discriminator D such that the training data score, corresponding to the modified training data inputted into the discriminator D or the modified obfuscated training data inputted into the discriminator D, is maximized and such that the obfuscated training data score is minimized. Herein, the discriminator D may generate the training data score representing whether its inputted data, i.e., the modified training data or the modified obfuscated training data, is real or fake.

That is, the learning device 100 may (i) acquire the (1_1)_1st error calculated by referring to the (1_1)-st characteristic information F1(x") and the (2_1)-st characteristic information F1(x), (ii) acquire the (11)_2nd error calculated by referring to the (1_2)-nd characteristic information F2(x") and the (2 2)-nd characteristic information F2(x), and similarly, (iii) acquire the (1_1)_n-th error calculated by referring to the (1_n)-th characteristic information Fn(x") and the (2_n)-th characteristic information Fn(x), and thus (iv) acquire the (1_1)-st error which is an average over the acquired (1_1)_1st error to the acquired (11)_n-th error. Then, the learning device 100 may acquire (i) the (1_2)_1st error calculated by referring to (i-1) the first task specific output created by using the (1_1)-st characteristic information F1(x") and (i-2) the first ground truth corresponding to the first task specific output to (ii) the (1_2)_n-th error calculated by referring to (ii-1) the n-th task specific output created by using the (1_n)-th characteristic information Fn(x") and (ii-2) the n-th ground truth corresponding to the n-th task specific output, and thus acquire the (1_2)-nd error which is an average over the acquired (1_2)_1st error to the (1_2)_n-th error. And, the learning device 100 may train the obfuscation network O such that the first error, which is calculated by referring to at least part of the (1-1)-st error and the (1-2)-nd error, is minimized and such that the second error is maximized.

Meanwhile, in the above description, the learning device 100 may perform or support another device to perform a process of training the obfuscation network O such that the first error is minimized which is calculated by referring to at least part of (i) the (1_1)-st error which is an average over (i-1) the (1_1)_1st error acquired by referring to the (1_1)-st characteristic information F1(x") and the (2 1)-st characteristic information F1(x) to (i-2) the (1_1)_n-th error acquired by referring to the (1_n)-th characteristic information Fn(x") and the (2_n)-th characteristic information Fn(x), and (ii) the (1_2)-nd error which is an average over (ii-1) the (1_2)_1st error acquired by referring to (ii-1-a) the first task specific output created by using the (1_1)-st characteristic information F1(x") and (ii-1-b) the first ground truth corresponding to the first task specific output to (ii-2) the (1_2)_n-th error acquired by referring to (ii-2-a) the n-th task specific output created by using the (1_n)-th characteristic information and (ii-2-b) the n-th ground truth corresponding to the n-th task specific output and such that the second error is maximized which is the obfuscated training data score corresponding to the obfuscated training data inputted into the discriminator D or the augmented obfuscated training data inputted into the discriminator D. As another example, the obfuscation network O may be sequentially trained such that (i) the (1_1)-st error calculated by referring to at least part of the (1_1)_1st error and the (1_2)_1st error to (ii) the (1_n)-th error calculated by referring to at least part of the (11)_n-th error and the (1_2)_n-th error are minimized.

That is, the learning device 100 may perform or support another device to perform a process of inputting the training data x into the obfuscation network O, to thereby allow the obfuscation network O to obfuscate the training data x and thus to generate first obfuscated training data x1' and a process of inputting the first obfuscated training data x1' into the augmentation network T, to thereby allow the augmentation network T to augment the first obfuscated training data x1' and thus to generate first augmented obfuscated training data x1". And, the learning device 100 may perform or support another device to perform (i) a process of inputting the first augmented obfuscated training data x1" into the first learning network F1, to thereby allow the first learning network F1 to (i-1) apply the learning operation to the first augmented obfuscated training data x1" by using the first learned parameters of the first learning network F1 and thus (i-2) output the (1_1)-st characteristic information F1(x1") corresponding to the first augmented obfuscated training data x1", and (ii) a process of inputting the training data x into the first learning network F1, to thereby allow the first learning network F1 to (ii-1) apply the learning operation to the training data x by using the first learned parameters and thus (ii-2) output the (2_1)-st characteristic information F1(x) corresponding to the training data x. Thereafter, the learning device 100 may perform or support another device to perform a process of training the obfuscation network O such that the (1_1)-st error is minimized which is calculated by referring to at least part of (i) the (1_1)_1st error acquired by referring to the (1-1)-st characteristic information F1(x1") and the (2-1)-st characteristic information F1(x), and (ii) the (1_2)_1st error acquired by referring to (ii-1) the first task specific output generated by using the (1_1)-st characteristic information F1(x11) and (ii-2) the first ground truth corresponding to the first task specific output and such that the (2_1)-st error is maximized which is the first obfuscated training data score, corresponding to the first obfuscated training data inputted into the discriminator D or the first augmented obfuscated training data x1" inputted into the discriminator D, to thereby allow the obfuscation network O to be a first trained obfuscation network O1. Herein, the discriminator D may generate the first obfuscated training data score representing whether its inputted data, i.e., the first obfuscated training data or the first augmented obfuscated training data, is real or fake. And the learning device 100 may perform or support another device to perform a process of training the discriminator D such that the first training data score, corresponding to the modified training data inputted into the discriminator D or the first modified obfuscated training data inputted into the discriminator D, is maximized and such that the first obfuscated training data score is minimized, to thereby allow the discriminator D to be a first trained discriminator Di. Herein, the discriminator D may generate the first training data score representing whether its inputted data, i.e., the modified training data or the first modified obfuscated training data, is real or fake.

And, while increasing an integer k from 2 to n, the learning device 100 may repeat the processes above up to the n-th learning network Fn, to thereby acquire an n-th obfuscation network On.

That is, the learning device 100 may perform or support another device to perform (i) a process of inputting the training data x into a (k−1)-th trained obfuscation network O(k−1), to thereby allow the (k−1)-th trained obfuscation network O(k−1) to obfuscate the training data x and thus to generate k-th obfuscated training data xk' and (ii) a process of inputting the k-th obfuscated training data xk' into the augmentation network T, to thereby allow the augmentation network T to augment the k-th obfuscated training data xk' and thus to generate k-th augmented obfuscated training data xk". And, the learning device 100 may perform or support another device to perform (i) a process of inputting the k-th augmented obfuscated training data xk" into the k-th learning network Fk, to thereby allow the k-th learning network Fk to apply a learning operation to the k-th augmented obfuscated training data xk" by using one or more k-th learned parameters of the k-th learning network Fk and thus to output the (1_k)-th characteristic information Fk(xk") corresponding to the k-th augmented obfuscated training data xk" and (ii) a process of inputting the training data x into the k-th learning network Fk, to thereby allow the k-th learning network Fk to apply the learning operation to the training data x by using the k-th learned parameters and thus to output the (2_k)-th characteristic information Fk(xk) corresponding to the training data x. Thereafter, the learning device 100 may perform or support another device to perform a process of training the (k−1)-th trained obfuscation network O(k−1) such that a (1_k)-th error is minimized which is calculated by referring to at least part of (i) a (1_1)_k-th error acquired by referring to the (1_k)-th characteristic information Fk(xk") and the (2_k)-th characteristic information Fk(x), and (ii) a (1_2)_k-th error acquired by referring to (ii-1) a k-th task specific output generated by using the (1_k)-th characteristic information Fk(x") and (ii-2) a k-th ground truth corresponding to the k-th task specific output and such that a (2_k)-th error is maximized which is a k-th obfuscated training data score, corresponding to k-th obfuscated training data inputted into a (k−1)-th trained discriminator D(k−1) or k-th augmented obfuscated training data xk" inputted into the (k−1)-th trained discriminator D(k−1), to thereby allow the (k−1)-th trained obfuscation network O(k−1) to be a k-th trained obfuscation network O(k). Herein, the (k−1)-th trained discriminator D(k−1) may generate the k-th obfuscated training data score representing whether its inputted data, i.e., the k-th obfuscated training data or the k-th augmented obfuscated training data, is real or fake. And the learning device 100 may perform or support another device to perform a process of training the (k−1)-th trained discriminator D(k−1) such that a k-th training data score, corresponding to the modified training data inputted into the (k−1)-th trained discriminator D(k−1) or the k-th modified obfuscated training data inputted into the (k−1)-th trained discriminator D(k−1), is maximized and such that the k-th obfuscated training data score is minimized, to thereby allow the (k−1)-th trained discriminator D(k−1) to be a k-th trained discriminator D(k). Herein, the (k−1)-th trained discriminator D(k−1) may generate the k-th training data score representing whether its inputted data, i.e., the modified training data or the k-th modified obfuscated training data, is real or fake.

Figure 6:
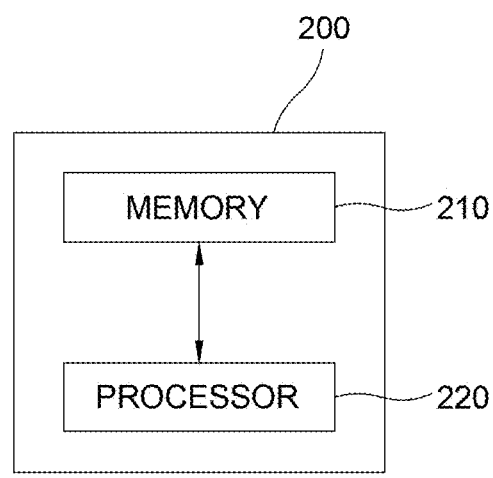
FIG. 6 is a drawing schematically illustrating a testing device for testing a trained obfuscation network in accordance with one example embodiment of the present disclosure.

FIG. 6 is a drawing schematically illustrating a testing device for testing a trained obfuscation network O in accordance with one example embodiment of the present disclosure.

By referring to FIG. 6, the testing device 200 in accordance with one example embodiment of the present disclosure may include a memory 210 for storing instructions to test the trained obfuscation network, which supports the augmentation, and has been trained to obfuscate test data such that the learning network outputs a result, generated by inputting obfuscated test data into the learning network, same as or similar to a result, generated by inputting the test data into the learning network, and a processor 220 for performing processes to test the trained obfuscation network according to the instructions in the memory 210.

Specifically, the testing device 200 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

Also, the processors of such devices may include hardware configuration of MPU (Micro Processing Unit) or CPU (Central Processing Unit), cache memory, data bus, etc. Additionally, the computing device may further include operating system (OS) and software configuration of applications that achieve specific purposes.

Such description of the computing device does not exclude an integrated device including any combination of a processor, a memory, a medium, or any other computing components for implementing the present disclosure.

Meanwhile, before processes of testing the trained obfuscation network are performed, the processes of training the obfuscation network as described above may be performed. That is, the learning device may have performed or supported another device to perform (i) a process of inputting training data into the obfuscation network, to thereby allow the obfuscation network to obfuscate the training data and thus to generate obfuscated training data and a process of inputting the obfuscated training data into the augmentation network, to thereby allow the augmentation network to augment the obfuscated training data and thus to generate augmented obfuscated training data, (ii) (ii-1) a process of inputting the augmented obfuscated training data into the learning network having the learned parameters, to thereby allow the learning network to apply a learning operation to the augmented obfuscated training data by using the learned parameters and thus to output first characteristic information for training on the augmented obfuscated training data and (ii-2) a process of inputting the training data into the learning network, to thereby allow the learning network to apply the learning operation to the training data by using the learned parameters and thus to output second characteristic information for training on the training data, and (iii) a process of training the obfuscation network such that the first error, calculated by referring to at least part of (iii-1) the (1_1)-st error acquired by referring to the first characteristic information for training and the second characteristic information for training, and (iii-2) the (1_2)-nd error acquired by referring to (iii-2-a) the task specific output created by using the first characteristic information for training and (iii-2-b) the ground truth corresponding to the task specific output, is minimized and such that the second error, calculated by referring to (iii-3) (iii-3-a) the modified training data or the modified obfuscated training data and (iii-3-b) the obfuscated training data or (iii-4) (iii-4-a) the modified training data or the modified obfuscated training data and (iii-4-b) the augmented obfuscated training data, is maximized. After such processes of training the obfuscated network have been performed, if test data is acquired, the processor 220 of the testing device 200 may perform or support another device to perform, according to the instructions stored in the memory 210, a process of inputting the test data into the obfuscation network which is trained to support the augmentation, to thereby allow the obfuscation network to obfuscate the test data by using the learned parameters of the obfuscation network and thus to output obfuscated test data, as anonymized test data or concealed test data.

Also, before the processes of testing the trained obfuscation network are performed, another example of the processes of training the obfuscation network as described above may be performed. That is, the learning device may have performed or supported another device to perform (i) a process of inputting the training data into the obfuscation network, to thereby allow the obfuscation network to obfuscate the training data and thus to generate obfuscated training data and a process of inputting the obfuscated training data into the augmentation network, to thereby allow the augmentation network to augment the obfuscated training data and thus to generate augmented obfuscated training data, (ii) (ii-1) a process of inputting the augmented obfuscated training data into the learning network having the learned parameters, to thereby allow the learning network to apply the learning operation to the augmented obfuscated training data by using the learned parameters and thus to output first characteristic information for training on the augmented obfuscated training data and (ii-2) a process of inputting the training data into the learning network, to thereby allow the learning network to apply the learning operation to the training data by using the learned parameters and thus to output second characteristic information for training on the training data, (iii) a process of training the obfuscation network such that the first error, calculated by referring to at least part of (iii-1) the (1_1)-st error acquired by referring to the first characteristic information for training and the second characteristic information for training, and (iii-2) the (1_2)-nd error acquired by referring to (iii-2-a) the task specific output created by using the first characteristic information for training and (iii-2-b) the ground truth corresponding to the task specific output, is minimized and such that the second error which is the obfuscated training data score, corresponding to the obfuscated training data inputted into the discriminator capable of determining whether its inputted data is real or fake or the augmented obfuscated training data inputted into the discriminator, is maximized, and (iv) a process of training the discriminator such that the training data score, corresponding to the modified training data inputted into the discriminator or the modified obfuscated training data inputted into the discriminator, is maximized and such that the obfuscated training data score is minimized. After such processes of training the obfuscated network have been performed, if the test data is acquired, the processor 220 of the testing device 200 may perform or support another device to perform, according to the instructions stored in the memory 210, a process of inputting the test data into the obfuscation network which is trained to support the augmentation, to thereby allow the obfuscation network to obfuscate the test data by using the learned parameters of the obfuscation network and thus to output the obfuscated test data as the anonymized test data or the concealed test data.

Figure 7:
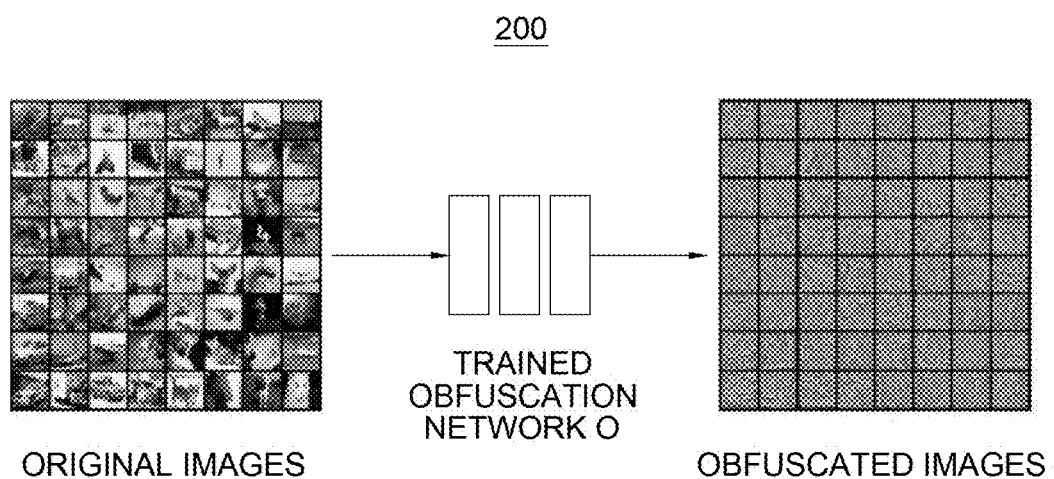
FIG. 7 is a drawing schematically illustrating a method for testing the trained obfuscation network in accordance with one example embodiment of the present disclosure.

FIG. 7 is a drawing schematically illustrating a method for testing the trained obfuscation network in accordance with one example embodiment of the present disclosure.

By referring to FIG. 7, the testing device 200 may (i) input the test data, for example, original images on a left side of FIG. 7, into the obfuscation network O which has been trained to obfuscate the original data such that the learning network outputs a result, generated by inputting the obfuscated data into the learning network, same or similar to a result generated by inputting the original data into the learning network and thus (ii) allow the obfuscation network O to obfuscate the test data according to the learned parameters, to thereby output the obfuscated test data, e.g., obfuscated images on a right side of FIG. 7.

For reference, the left side of FIG. 7 is a drawing exemplarily illustrating 64 image samples selected from the CIFAR-10 dataset which includes images collected and labeled by Canadian Institute for Advanced Research (CIFAR) for image classification.

The obfuscated data generated by obfuscating, e.g., anonymizing or concealing, the image samples on the left side of FIG. 7 used as the original data, in accordance with the present disclosure, are shown on the right side of FIG. 7.

By referring to FIG. 7, 64 pieces of the obfuscated data on the right side of FIG. 7 which are obfuscated, e.g., anonymized or concealed, in accordance with the present disclosure are visually different from 64 pieces of the original data on the left side of FIG. 7, but if the 64 pieces of the obfuscated data are inputted into the learning network, the learning network outputs a result same as or similar to that of the original data.

Meanwhile, the trained obfuscation network O may have been trained beforehand by processes similar to those in description of FIGS. 2 to 5.

That is, the learning device may have performed or supported another device to perform (i) a process of inputting training data into the obfuscation network, to thereby allow the obfuscation network to obfuscate the training data and thus to generate the obfuscated training data and a process of inputting the obfuscated training data into the augmentation network, to thereby allow the augmentation network to augment the obfuscated training data and thus to generate augmented obfuscated training data, (ii) (ii-1) a process of inputting the augmented obfuscated training data into the learning network having the learned parameters, to thereby allow the learning network to apply the learning operation to the augmented obfuscated training data by using the learned parameters and thus to output the first characteristic information for training on the augmented obfuscated training data and (ii-2) a process of inputting the training data into the learning network, to thereby allow the learning network to apply the learning operation to the training data by using the learned parameters and thus to output the second characteristic information for training on the training data, and (iii) a process of training the obfuscation network such that the first error, calculated by referring to at least part of (iii-1) the (1_1)-st error acquired by referring to the first characteristic information for training and the second characteristic information for training, and (iii-2) the (1_2)-nd error acquired by referring to (iii-2-a) the task specific output created by using the first characteristic information for training and (iii-2-b) the ground truth corresponding to the task specific output, is minimized and such that the second error, calculated by referring to (iii-3) (iii-3-a) the modified training data or the modified obfuscated training data and (iii-3-b) the obfuscated training data or (iii-4) (iii-4-a) the modified training data or the modified obfuscated training data and (iii-4-b) the augmented obfuscated training data, is maximized, to thereby allow the obfuscation network to be the trained obfuscation network O.

Also, in the above description, the learning network may include the first learning network to the n-th learning network respectively having the first learned parameters to the n-th learned parameters, and the learning device may have performed or supported another device to perform (i) a process of inputting the augmented obfuscated training data into each of the first learning network to the n-th learning network, to thereby allow each of the first learning network to the n-th learning network to (i-1) apply its corresponding learning operation to the augmented obfuscated training data by using respectively the first learned parameters to the n-th learned parameters of the first learning network to the n-th learning network, and thus (i-2) output each piece of the (1_1)-st characteristic information for training to the (1_n)-th characteristic information for training on the augmented obfuscated training data, (ii) a process of inputting the training data into each of the first learning network to the n-th learning network, to thereby allow each of the first learning network to the n-th learning network to (ii-1) apply its corresponding learning operation to the training data by using respectively the first learned parameters to the n-th learned parameters of the first learning network to the n-th learning network, and thus (ii-2) output each piece of the (2_1)-st characteristic information for training to the (2_n)-th characteristic information for training on the training data, and (iii) a process of training the obfuscation network such that the first error is minimized which is calculated by referring to at least part of (iii-1) the (1_1)-st error which is an average over (iii-1-a) the (1_1)_1st error acquired by referring to the (1_1)-st characteristic information for training and the (2_1)-st characteristic information for training to (iii-1-b) the (1_1)_n-th error acquired by referring to the (1_n)-th characteristic information for training and the (2_n)-th characteristic information for training, and (iii-2) the (1_2)-nd error which is an average over (iii-2-a) the (1_2)_1st error acquired by referring to the first task specific output, created by using the (1_1)-st characteristic information for training, and to the first ground truth corresponding to the first task specific output to (iii-2-b) the (1_2)_n-th error acquired by referring to the n-th task specific output, created by using the (1_n)-th characteristic information for training, and to the n-th ground truth corresponding to the n-th task specific output, and such that the second error is maximized which is calculated by referring to (iii-3) (iii-3-a) the modified training data or the modified obfuscated training data and (iii-3-b) the obfuscated training data or (iii-4) (iii-4-a) the modified training data or the modified obfuscated training data and (iii-4-b) the augmented obfuscated training data.

And, the learning device may have performed or supported another device to perform (i) a process of inputting the training data into the obfuscation network, to thereby allow the obfuscation network to obfuscate the training data and thus to generate obfuscated training data and a process of inputting the obfuscated training data into the augmentation network, to thereby allow the augmentation network to augment the obfuscated training data and thus to generate augmented obfuscated training data (ii) (ii-1) a process of inputting the augmented obfuscated training data into the learning network having the learned parameters, to thereby allow the learning network to apply the learning operation to the augmented obfuscated training data by using the learned parameters and thus to output the first characteristic information for training on the augmented obfuscated training data and (ii-2) a process of inputting the training data into the learning network, to thereby allow the learning network to apply the learning operation to the training data by using the learned parameters and thus to output the second characteristic information for training on the training data, (iii) a process of training the obfuscation network such that the first error is minimized which is calculated by referring to at least part of (iii-1) the (1_1)-st error which is an average over (iii-1-a) the (1_1)_1st error calculated by referring to the (1_1)-st characteristic information for training and the (2_1)-st characteristic information for training to (iii-1-b) the (1_1)_n-th error calculated by referring to the (1_n)-th characteristic information for training and the (2_n)-th characteristic information for training, and (iii-2) the (1_2)-nd error which is an average over (iii-2-a) the (1_2)_1st error calculated by referring to the first task specific output, created by using the (1_1)-st characteristic information for training, and to the first ground truth corresponding to the first task specific output to (iii-2-b) the (1_2)_n-th error calculated by referring to the n-th task specific output, created by using the (1_n)-th characteristic information for training, and to the n-th ground truth corresponding to the n-th task specific output and such that the second error which is the obfuscated training data score, corresponding to the obfuscated training data inputted into the discriminator capable of determining whether its inputted data is real or fake or the augmented obfuscated training data inputted into the discriminator, is maximized, and (iv) a process of training the discriminator such that the training data score, corresponding to the modified training data inputted into the discriminator or the modified obfuscated training data inputted into the discriminator, is maximized and such that the obfuscated training data score is minimized.

Also, in the above description, the learning network may include the first learning network to the n-th learning network respectively having the first learned parameters to the n-th learned parameters, and the learning device may have performed or supported another device to perform (i) a process of inputting the augmented obfuscated training data into each of the first learning network to the n-th learning network, to thereby allow each of the first learning network to the n-th learning network to (i-1) apply its corresponding learning operation to the augmented obfuscated training data by using respectively the first learned parameters to the n-th learned parameters of the first learning network to the n-th learning network, and thus (i-2) output each piece of the (1_1)-st characteristic information for training to the (1_n)-th characteristic information for training on the augmented obfuscated training data, (ii) a process of inputting the training data into each of the first learning network to the n-th learning network, to thereby allow each of the first learning network to the n-th learning network to (ii-1) apply its corresponding learning operation to the training data by using respectively the first learned parameters to the n-th learned parameters of the first learning network to the n-th learning network, and thus (ii-2) output each piece of the (2_1)-st characteristic information for training to the (2_n)-th characteristic information for training on the training data, (iii) a process of training the obfuscation network such that the first error is minimized which is calculated by referring to at least part of(iii-1) the (1_1)-st error which is an average over (iii-1-a) the (1_1)_1st error acquired by referring to the (1_1)-st characteristic information for training and the (2_1)-st characteristic information for training to (iii-1-b) the (1_1)_n-th error acquired by referring to the (1_n)-th characteristic information for training and the (2_n)-th characteristic information for training, and (iii-2) the (1_2)-nd error which is an average over (iii-2-a) the (1_2)_1st error acquired by referring to the first task specific output, created by using the (1_1)-st characteristic information for training, and to the first ground truth corresponding to the first task specific output to (iii-2-b) the (1_2)_n-th error acquired by referring to the n-th task specific output, created by using the (1_n)-th characteristic information for training, and to the n-th ground truth corresponding to the n-th task specific output, and such that the second error is maximized which is the obfuscated training data score corresponding to the modified training data inputted into the discriminator or the augmented obfuscated training data inputted into the discriminator and (iv) a process of training the discriminator such that the training data score, corresponding to the modified training data inputted into the discriminator or the modified obfuscated training data inputted into the discriminator, is maximized and such that the obfuscated training data score is minimized.

Meanwhile, the obfuscated data, which are obfuscated, e.g., anonymized or concealed, by the trained obfuscation network in accordance with the present disclosure may be provided or sold to a buyer of big data of images.

Also, in accordance with one example embodiment of the present disclosure, when the obfuscated image data, e.g., anonymized image data or concealed image data, are provided or sold to the buyer, the testing method of the trained obfuscation network may be provided as implemented in a form of program instructions executable by a variety of computer components and recorded to computer readable media. In accordance with one example embodiment of the present disclosure, the buyer may execute the program instructions recorded in the computer readable media by using the computer devices, to thereby generate obfuscated data, e.g., anonymized data or concealed data, from the original data owned by the buyer or acquired from other sources, and use the obfuscated data for his/her own learning network. Also, the buyer may use at least two of the obfuscated data, the original image data owned by the buyer or acquired from other sources, and the obfuscated image data provided or sold to the buyer, together for the buyer's learning network.

Meanwhile, if the testing method of the trained obfuscation network is implemented as the program instructions that can be executed by a variety of the computer components, then computational overhead may occur in the computing devices of the buyer when accuracy of the trained obfuscation network is set as high. Therefore, in accordance with one example embodiment of the present disclosure, the buyer is allowed to lower the accuracy to prevent the computational overhead.

The present disclosure has an effect of performing obfuscation, e.g., anonymization or concealment, in a simple and accurate way, by eliminating a process of searching general data for personal identification information and a process of obfuscating, e.g., anonymizing or concealing, the personal identification information.

The present disclosure has another effect of protecting privacy and security of original data by generating obfuscated data, e.g., anonymized data or concealed data, through irreversibly obfuscating the original data.

The present disclosure has still another effect of generating the obfuscated data recognized as similar or same by computers but recognized as different by humans.

The present disclosure has still yet another effect of stimulating a big data trade market.

The embodiments of the present disclosure as explained above can be implemented in a form of executable program command through a variety of computer means recordable in computer readable media. The computer readable media may include solely or in combination, program commands, data files, and data structures. The program commands recorded to the media may be components specially designed for the present disclosure or may be usable to those skilled in the art of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands may include not only a machine language code made by a complier but also a high level code that can be used by an interpreter etc., which may be executed by a computer. The aforementioned hardware device can work as more than a software module to perform the action of the present disclosure and vice versa.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for training an obfuscation network to be used for obfuscating original data to protect personal information, comprising steps of:
   (a) if training data is acquired, a learning device performing or supporting another device to perform (i) a process of inputting the training data into an obfuscation network, to thereby allow the obfuscation network to obfuscate the training data and thus to generate obfuscated training data and (ii) a process of inputting the obfuscated training data into an augmentation network, to thereby allow the augmentation network to augment the obfuscated training data and thus to generate augmented obfuscated training data;
   (b) the learning device performing or supporting another device to perform (i) a process of inputting the augmented obfuscated training data into a learning network having one or more learned parameters, to thereby allow the learning network to (i-1) apply a learning operation to the augmented obfuscated training data by using the learned parameters and thus (i-2) generate first characteristic information for training corresponding to the augmented obfuscated training data and (ii) a process of inputting the training data into the learning network, to thereby allow the learning network to (ii-1) apply the learning operation to the training data by using the learned parameters and thus (ii-2) generate second characteristic information for training corresponding to the training data; and
   (c) the learning device performing or supporting another device to perform a process of training the obfuscation network such that (i) at least one first error, calculated by referring to the first characteristic information for training and the second characteristic information for training, is minimized and (ii) at least one second error, calculated by referring to (ii-1) (ii-1-a) modified training data, created by modifying the training data, or modified obfuscated training data, created by modifying the obfuscated training data, and (ii-1-b) the obfuscated training data or (ii-2) (ii-2-a) the modified training data or the modified obfuscated training data and (ii-2-b) the augmented obfuscated training data, is maximized,
   wherein the learning network includes a 1st learning network to an n-th learning network respectively having one or more 1st learned parameters to one or more n-th learned parameters wherein n is an integer greater than 1, wherein, at the step of (b), the learning device performs or supports another device to perform (i) a process of inputting the augmented obfuscated training data into each of the first learning network to the n-th learning network, to thereby allow each of the first learning network to the n-th learning network to (i-1) apply its corresponding learning operation to the augmented obfuscated training data by using respectively the first learned parameters to the n-th learned parameters of the first learning network to the n-th learning network, and thus (i-2) output each piece of (1_1)-st characteristic information for training to (1_n)-th characteristic information for training on the augmented obfuscated training data and (ii) a process of inputting the training data into each of the first learning network to the n-th learning network, to thereby allow each of the first learning network to the n-th learning network to (ii-1) apply its corresponding learning operation to the training data by using respectively the first learned parameters to the n-th learned parameters, and thus (ii-2) output each piece of (2_1)-st characteristic information for training to (2_n)-th characteristic information for training on the training data, and wherein, at the step of (c), the learning device performs or supports another device to perform a process of training the obfuscation network such that the first error, which is an average over (1) a (1_1)-st error calculated by referring to the (1_1)-st characteristic information for training and the (2_1)-st characteristic information for training to (2) a (1_n)-th error calculated by referring to the (1_n)-th characteristic information for training and the (2_n)-th characteristic information for training, is minimized and such that the second error is maximized.

2. The method of claim 1, wherein, at the step of (c), on condition that an obfuscated training data score, corresponding to the obfuscated training data inputted into a discriminator capable of determining whether its inputted data is real or fake or the augmented obfuscated training data inputted into the discriminator, has been acquired as the second error, the learning device performs or supports another device to perform a process of training the obfuscation network such that the first error is minimized and the second error is maximized and a process of training the discriminator such that a training data score, corresponding to the modified training data inputted into the discriminator or the modified obfuscated training data inputted into the discriminator, is maximized and such that the obfuscated training data score is minimized.

3. The method of claim 2, wherein a maximum of the training data score, corresponding to the modified training data inputted into the discriminator or the modified obfuscated training data inputted into the discriminator, is 1 as a value for determining the modified training data or the modified obfuscated training data as real and wherein a minimum of the obfuscated training data score, corresponding to the obfuscated training data inputted into the discriminator or the augmented obfuscated training data inputted into the discriminator, is 0 as a value for determining the obfuscated training data or the augmented obfuscated training data as fake.

4. The method of claim 1, wherein, at the step of (c), the learning device performs or supports another device to perform a process of calculating the first error by referring to a difference between the first characteristic information for training and the second characteristic information for training and a process of calculating the second error by referring to (1) a difference between (1-a) the modified training data or the modified obfuscated training data and (1-b) the obfuscated training data or (2) a difference between (2-a) the modified training data or the modified obfuscated training data and (2-b) the augmented obfuscated training data.

5. The method of claim 4, wherein the learning device performs or supports another device to perform a process of acquiring the first error by referring to a norm or a cosine similarity between the first characteristic information for training and the second characteristic information for training.

6. The method of claim 1, wherein, at the step of (c), the learning device performs or supports another device to perform a process of calculating the first error by further referring to at least one class loss which is calculated by referring to (1) each of probabilities that each piece of the first characteristic information for training, each piece of which is mapped onto each class, belongs to its corresponding class and (2) a ground truth corresponding to the training data.

7. The method of claim 1, wherein, at the step of (c), the learning device performs or supports another device to perform a process of measuring at least one quality by referring to at least part of an entropy of the augmented obfuscated training data and a degree of noise of the
   augmented obfuscated training data and a process of acquiring the first error by further referring to the measured quality.

8. A method for training an obfuscation network to be used for obfuscating original data to protect personal information, comprising steps of:
   (a) if training data is acquired, a learning device performing or supporting another device to perform (i) a process of inputting the training data into an obfuscation network, to thereby allow the obfuscation network to obfuscate the training data and thus to generate obfuscated training data and (ii) a process of inputting the obfuscated training data into an augmentation network, to thereby allow the augmentation network to augment the obfuscated training data and thus to generate augmented obfuscated training data;
   (b) the learning device performing or supporting another device to perform (i) a process of inputting the augmented obfuscated training data into a learning network having one or more learned parameters, to thereby allow the learning network to (i-1) apply a learning operation to the augmented obfuscated training data by using the learned parameters and thus (i-2) generate first characteristic information for training corresponding to the augmented obfuscated training data and (ii) a process of inputting the training data into the learning network, to thereby allow the learning network to (ii-1) apply the learning operation to the training data by using the learned parameters and thus (ii-2) generate second characteristic information for training corresponding to the training data; and
   (c) the learning device performing or supporting another device to perform a process of training the obfuscation network such that (i) at least one first error, calculated by referring to the first characteristic information for training and the second characteristic information for training, is minimized and (ii) at least one second error, calculated by referring to (ii-1) (ii-1-a) modified training data, created by modifying the training data, or modified obfuscated training data, created by modifying the obfuscated training data, and (ii-1-b) the obfuscated training data or (ii-2) (ii-2-a) the modified training data or the modified obfuscated training data and (ii-2-b) the augmented obfuscated training data, is maximized, wherein the learning network includes a first learning network to an n-th learning network respectively having one or more first learned parameters to one or more n-th learned parameters wherein n is an integer greater than 2, wherein, at the step of (a), the learning device performs or supports another device to perform (i) a process of inputting the training data into the obfuscation network, to thereby allow the obfuscation network to obfuscate the training data and thus to generate first obfuscated training data and (ii) a process of inputting the first obfuscated training data into the augmentation network, to thereby allow the augmentation network to augment the first obfuscated training data and thus to generate first augmented obfuscated training data, wherein, at the step of (b), the learning device performs or supports another device to perform (i) a process of inputting the first augmented obfuscated training data into the first learning network, to thereby allow the first learning network to (i-1) apply the learning operation to the first augmented obfuscated training data by using the first learned parameters of the first learning network and thus (i-2) output (1_1)-st characteristic information for training on the first augmented obfuscated training data and (ii) a process of inputting the training data into the first learning network, to thereby allow the first learning network to (ii-1) apply the learning operation to the training data by using the first learned parameters and thus (ii-2) output (2_1)-st characteristic information for training on the training data, wherein, at the step of (c), the learning device performs or supports another device to perform a process of training the obfuscation network such that (i) at least one (1_1)-st error, calculated by referring to the (1_1)-st characteristic information for training and the (2_1)-st characteristic information for training, is minimized and (ii) at least one (2_1)-st error, calculated by referring to (ii-1) (ii-1-a) the modified training data or first modified obfuscated training data created by modifying the first obfuscated training data and (ii-1-b) the first obfuscated training data or (ii-2) (ii-2-a) the modified training data or the first modified obfuscated training data and (ii-2-b) the first augmented obfuscated training data, is maximized, to thereby allow the obfuscation network to be a first trained obfuscation network, and wherein, while increasing an integer k from 2 to n, the learning device performs or supports another device to perform (i) a process of inputting the training data into the (k−1)-th trained obfuscation network, to thereby allow the (k−1)-th trained obfuscation network to obfuscate the training data and thus to generate k-th obfuscated training data and a process of inputting the k-th obfuscated training data into the augmentation network, to thereby allow the augmentation network to augment the k-th obfuscated training data and thus to generate k-th augmented obfuscated training data, (ii) (ii-1) a process of inputting the k-th augmented obfuscated training data into a k-th learning network, to thereby allow the k-th learning network to apply the learning operation to the k-th augmented obfuscated training data by using one or more k-th learned parameters of the k-th learning network and thus to output (1_k)-th characteristic information for training on the k-th augmented obfuscated training data and (ii-2) a process of inputting the training data into the k-th learning network, to thereby allow the k-th learning network to apply the learning operation to the training data by using the k-th learned parameters and thus to output (2_k)-th characteristic information for training on the training data, and (iii) a process of training the (k−1)-th trained obfuscation network such that at least one (1_k)-th error, calculated by referring to the (1_k)-th characteristic information for training and the (2_k)-th characteristic information for training, is minimized and such that at least one (2_k)-th error, which is calculated by referring to (iii-1) (iii-1-a) the modified training data or k-th modified obfuscated training data calculated by modifying the k-th obfuscated training data and (iii-1-b) the k-th obfuscated training data or (iii-2) (iii-2-a) the modified training data or the k-th modified obfuscated training data and (iii-2-b) the k-th augmented obfuscated training data, is maximized, to thereby allow the (k−1)-th trained obfuscation network to be a k-th trained obfuscation network.

9. A method for training an obfuscation network to be used for obfuscating original data to protect personal information, comprising steps of:

(a) if training data is acquired, a learning device performing or supporting another device to perform (i) a process of inputting the training data into an obfuscation network, to thereby allow the obfuscation network to obfuscate the training data and thus to generate obfuscated training data and (ii) a process of inputting the obfuscated training data into an augmentation network, to thereby allow the augmentation network to augment the obfuscated training data and thus to generate augmented obfuscated training data;

(b) the learning device performing or supporting another device to perform (i) a process of inputting the augmented obfuscated training data into a learning network having one or more learned parameters, to thereby allow the learning network to (i-1) apply a learning operation to the augmented obfuscated training data by using the learned parameters and thus (i-2) generate first characteristic information for training corresponding to the augmented obfuscated training data and (ii) a process of inputting the training data into the learning network, to thereby allow the learning network to (ii-1) apply the learning operation to the training data by using the learned parameters and thus (ii-2) generate second characteristic information for training corresponding to the training data; and (c) the learning device performing or supporting another device to perform a process of training the obfuscation network such that (i) at least one first error, calculated by referring to the first characteristic information for training and the second characteristic information for training, is minimized and (ii) at least one second error, calculated by referring to (ii-1) (ii-1-a) modified training data, created by modifying the training data, or modified obfuscated training data, created by modifying the obfuscated training data, and (ii-1-b) the obfuscated training data or (ii-2) (ii-2-a) the modified training data or the modified obfuscated training data and (ii-2-b) the augmented obfuscated training data, is maximized, wherein, at the step of (c), on condition that an obfuscated training data score, corresponding to the obfuscated training data inputted into a discriminator capable of determining whether its inputted data is real or fake or the augmented obfuscated training data inputted into the discriminator, has been acquired as the second error, the learning device performs or supports another device to perform a process of training the obfuscation network such that the first error is minimized and the second error is maximized and a process of training the discriminator such that a training data score, corresponding to the modified training data inputted into the discriminator or the modified obfuscated training data inputted into the discriminator, is maximized and such that the obfuscated training data score is minimized, wherein the learning network includes a first learning network to an n-th learning network respectively having one or more first learned parameters to one or more n-th learned parameters wherein n is an integer greater than 1, wherein, at the step of (b), the learning device performs or supports another device to perform (i) a process of inputting the augmented obfuscated training data into each of the first learning network to the n-th learning network, to thereby allow each of the first learning network to the n-th learning network to (i-1) apply its corresponding learning operation to the augmented obfuscated training data by using respectively the first learned parameters to the n-th learned parameters of the first learning network to the n-th learning network, and thus (i-2) output each piece of (1_1)-st characteristic information for training to (1_n)-th characteristic information for training on the augmented obfuscated training data and (ii) a process of inputting the training data into each of the first learning network to the n-th learning network, to thereby allow each of the first learning network to the n-th learning network to (ii-1) apply its corresponding learning operation to the training data by using respectively the first learned parameters to the n-th learned parameters, and thus (ii-2) output each piece of (2_1)-st characteristic information for training to (2_n)-th characteristic information for training on the training data, and wherein, at the step of (c), the learning device performs or supports another device to perform (i) a process of training the obfuscation network such that the first error, which is an average over (i-1) at least one (1_1)-st error calculated by referring to the (1_1)-st characteristic information for training and the (2_1)-st characteristic information for training to (i-2) at least one (1_n)-th error calculated by referring to the (1_n)-th characteristic information for training and the (2_n)-th characteristic information for training, is minimized and such that the second error, which is the obfuscated training data score, corresponding to the obfuscated training data inputted into the discriminator or the augmented obfuscated training data inputted into the discriminator, is maximized and (ii) a process of training the discriminator such that the training data score, corresponding to the modified training data inputted into the discriminator or the modified obfuscated training data inputted into the discriminator, is maximized and such that the obfuscated training data score is minimized.

10. A method for training an obfuscation network to be used for obfuscating original data to protect personal information, comprising steps of:

(a) if training data is acquired, a learning device performing or supporting another device to perform (i) a process of inputting the training data into an obfuscation network, to thereby allow the obfuscation network to obfuscate the training data and thus to generate obfuscated training data and (ii) a process of inputting the obfuscated training data into an augmentation network, to thereby allow the augmentation network to augment the obfuscated training data and thus to generate augmented obfuscated training data;

(b) the learning device performing or supporting another device to perform (i) a process of inputting the augmented obfuscated training data into a learning network having one or more learned parameters, to thereby allow the learning network to (i-1) apply a learning operation to the augmented obfuscated training data by using the learned parameters and thus (i-2) generate first characteristic information for training corresponding to the augmented obfuscated training data and (ii) a process of inputting the training data into the learning network, to thereby allow the learning network to (ii-1) apply the learning operation to the training data by using the learned parameters and thus (ii-2) generate second characteristic information for training corresponding to the training data; and (c) the learning device performing or supporting another device to perform a process of training the obfuscation network such that (i) at least one first error, calculated by referring to the first characteristic information for training and the second characteristic information for training, is minimized and (ii) at least one second error, calculated by referring to (ii-1) (ii-1-a) modified training data, created by modifying the training data, or modified obfuscated training data, created by modifying the obfuscated training data, and (ii-1-b) the obfuscated training data or (ii-2) (ii-2-a) the modified training data or the modified obfuscated training data and (ii-2-b) the augmented obfuscated training data, is maximized, wherein, at the step of (c), on condition that an obfuscated training data score, corresponding to the obfuscated training data inputted into a discriminator capable of determining whether its inputted data is real or fake or the augmented obfuscated training data inputted into the discriminator, has been acquired as the second error, the learning device performs or supports another device to perform a process of training the obfuscation network such that the first error is minimized and the second error is maximized and a process of training the discriminator such that a training data score, corresponding to the modified training data inputted into the discriminator or the modified obfuscated training data inputted into the discriminator, is maximized and such that the obfuscated training data score is minimized, wherein the learning network includes a first learning network to an n-th learning network respectively having one or more first learned parameters to one or more n-th learned parameters wherein n is an integer greater than 2, wherein, at the step of (a), the learning device performs or supports another device to perform (i) a process of inputting the training data into the obfuscation network, to thereby allow the obfuscation network to obfuscate the training data and thus to generate first obfuscated training data and (ii) a process of inputting the first obfuscated training data into the augmentation network, to thereby allow the augmentation network to augment the first obfuscated training data and thus to generate first augmented obfuscated training data, wherein, at the step of (b), the learning device performs or supports another device to perform (i) a process of inputting the first augmented obfuscated training data into the first learning network, to thereby allow the first learning network to (i-1) apply the learning operation to the first augmented obfuscated training data by using the first learned parameters of the first learning network and thus (i-2) output (1_1)-st characteristic information for training on the first augmented obfuscated training data and (ii) a process of inputting the training data into the first learning network, to thereby allow the first learning network to (ii-1) apply the learning operation to the training data by using the first learned parameters and thus (ii-2) output (2_1)-st characteristic information for training on the training data, wherein, at the step of (c), the learning device performs or supports another device to perform (i) a process of training the obfuscation network such that at least one (1_1)-st error, calculated by referring to the (1_1)-st characteristic information for training and the (2_1)-st characteristic information for training, is minimized and such that at least one (2_1)-st error, which is a first obfuscated training data score, corresponding to the first obfuscated training data inputted into the discriminator or the first augmented obfuscated training data inputted into the discriminator, is maximized, to thereby allow the obfuscation network to be a first trained obfuscation network and (ii) a process of training the discriminator such that a first training data score, corresponding to the modified training data inputted into the discriminator or first modified obfuscated training data inputted into the discriminator, is maximized and such that the first obfuscated training data score is minimized, to thereby allow the discriminator to be a first trained discriminator, wherein the first modified obfuscated training data is created by modifying the first obfuscated training data and wherein, while increasing an integer k from 2 to n, the learning device performs or supports another device to perform (i) a process of inputting the training data into the (k−1)-th trained obfuscation network, to thereby allow the (k−1)-th trained obfuscation network to obfuscate the training data and thus to generate k-th obfuscated training data and a process of inputting the k-th obfuscated training data into the augmentation network, to thereby allow the augmentation network to augment the k-th obfuscated training data and thus to generate k-th augmented obfuscated training data, (ii) (ii-1) a process of inputting the k-th augmented obfuscated training data into a k-th learning network, to thereby allow the k-th learning network to apply the learning operation to the k-th augmented obfuscated training data by using one or more k-th learned parameters of the k-th learning network and thus to output (1_k)-th characteristic information for training on the k-th augmented obfuscated training data and (ii-2) a process of inputting the training data into the k-th learning network, to thereby allow the k-th learning network to apply the learning operation to the training data by using the k-th learned parameters and thus to output (2_k)-th characteristic information for training on the training data, and (iii) (iii-1) a process of training the (k−1)-th trained obfuscation network such that at least one (1_k)-th error, calculated by referring to the (1_k)-th characteristic information for training and the (2_k)-th characteristic information for training, is minimized and such that at least one (2_k)-th error, which is a k-th obfuscated training data score, corresponding to the k-th obfuscated training data inputted into a (k−1)-th trained discriminator or the k-th augmented obfuscated training data inputted into the (k−1)-th trained discriminator, is maximized, to thereby allow the (k−1)-th trained obfuscation network to be a k-th trained obfuscation network and (iii-2) a process of training the (k−1)-th trained discriminator such that a k-th training data score, corresponding to the modified training data inputted into the (k−1)-th trained discriminator or k-th modified obfuscated training data inputted into the (k−1)-th trained discriminator, is maximized and such that the k-th obfuscated training data is minimized, to thereby allow the (k−1)-th trained discriminator to be a k-th trained discriminator, wherein the k-th modified obfuscated training data is created by modifying the k-th obfuscated training data.

11. A method for testing an obfuscation network to be used for obfuscating original data to protect personal information, comprising steps of:

a testing device, on condition that the learning device has performed or supported another device to perform (i) a process of inputting training data into an obfuscation network, to thereby allow the obfuscation network to obfuscate the training data and thus to generate obfuscated training data and a process of inputting the obfuscated training data into an augmentation network, to thereby allow the augmentation network to augment the obfuscated training data and thus to generate augmented obfuscated training data, (ii) (ii-1) a process of inputting the augmented obfuscated training data into a learning network having one or more learned parameters, to thereby allow the learning network to apply a learning operation to the augmented obfuscated training data by using the learned parameters and thus to output first characteristic information for training on the augmented obfuscated training data and (ii-2) a process of inputting the training data into the learning network, to thereby allow the learning network to apply the learning operation to the training data by using the learned parameters and thus to output second characteristic information for training on the training data, and (iii) a process of training the obfuscation network such that at least one first error, calculated by referring to the first characteristic information for training and the second characteristic information for training, is minimized and such that at least one second error, which is calculated by referring to (iii-1) (iii-1-a) modified training data, created by modifying the training data, or modified obfuscated training data, created by modifying the obfuscated training data, and (iii-1-b) the obfuscated training data or (iii-2) (iii-2-a) the modified training data or the modified obfuscated training data and (iii-2-b) the augmented obfuscated training data, is maximized, performing or supporting another device to perform a process of acquiring test data; and (b) the testing device performing or supporting another device to perform a process of inputting the test data into the obfuscation network, which is trained to support augmentation, to thereby allow the obfuscation network to obfuscate the test data by using the learned parameters of the obfuscation network and thus to output obfuscated test data, wherein, at the step of (a), the learning network includes a first learning network to an n-th learning network respectively having one or more first parameters to one or more n-th learned parameters wherein n is an integer greater than 1, and wherein the learning device has performed or supported another device to perform (i) a process of inputting the augmented obfuscated training data into each of the first learning network to the n-th learning network, to thereby allow each of the first learning network to the n-th learning network to (i-1) apply its corresponding learning operation to the augmented obfuscated training data by using respectively the first learned parameters to the n-th learned parameters of the first learning network to the n-th learning network, and thus (i-2) output each piece of (1_1)-st characteristic information for training to (1_n)-th characteristic information for training on the augmented obfuscated training data, (ii) a process of inputting the training data into each of the first learning network to the n-th learning network, to thereby allow each of the first learning network to the n-th learning network to (ii-1) apply its corresponding learning operation to the training data by using respectively the first learned parameters to the n-th learned parameters, and thus (ii-2) output each piece of (2_1)-st characteristic information for training to (2_n)-th characteristic information for training on the training data, and (iii) a process of training the obfuscation network such that the first error is minimized which is an average over (iii-1) the (1_1)-st error acquired by referring to the (1_1)-st characteristic information for training and the (2_1)-st characteristic information for training to (iii-2) the (1_n)-th error acquired by referring to the (1_n)-th characteristic information for training and the (2_n)-th characteristic information for training and such that the second error is maximized which is calculated by referring to (iii-3) (iii-3-a) the modified training data or the modified obfuscated training data and (iii-3-b) the obfuscated training data or (iii-4) (iii-4-a) the modified training data or the modified obfuscated training data and (iii-4-b) the augmented obfuscated training data.

12. The method of claim 11, wherein, at the step of (a), upon acquiring an obfuscated training data score, as the second error, corresponding to the obfuscated training data inputted into a discriminator capable of determining whether its inputted data is real or fake or the augmented obfuscated training data inputted into the discriminator, the learning device has performed or supported another device to perform a process of training the obfuscation network such that the first error is minimized and the second error is maximized and a process of training the discriminator such that a training data score, corresponding to the modified training data inputted into the discriminator or the modified obfuscated training data inputted into the discriminator, is maximized and such that the obfuscated training data score is minimized.

13. A method for testing an obfuscation network to be used for obfuscating original data to protect personal information, comprising steps of:

a testing device, on condition that the learning device has performed or supported another device to perform (i) a process of inputting training data into an obfuscation network, to thereby allow the obfuscation network to obfuscate the training data and thus to generate obfuscated training data and a process of inputting the obfuscated training data into an augmentation network, to thereby allow the augmentation network to augment the obfuscated training data and thus to generate augmented obfuscated training data, (ii) (ii-1) a process of inputting the augmented obfuscated training data into a learning network having one or more learned parameters, to thereby allow the learning network to apply a learning operation to the augmented obfuscated training data by using the learned parameters and thus to output first characteristic information for training on the augmented obfuscated training data and (ii-2) a process of inputting the training data into the learning network, to thereby allow the learning network to apply the learning operation to the training data by using the learned parameters and thus to output second characteristic information for training on the training data, and (iii) a process of training the obfuscation network such that at least one first error, calculated by referring to the first characteristic information for training and the second characteristic information for training, is minimized and such that at least one second error, which is calculated by referring to (iii-1) (iii-1-a) modified training data, created by modifying the training data, or modified obfuscated training data, created by modifying the obfuscated training data, and (iii-1-b) the obfuscated training data or (iii-2) (iii-2-a) the modified training data or the modified obfuscated training data and (iii-2-b) the augmented obfuscated training data, is maximized, performing or supporting another device to perform a process of acquiring test data; and (b) the testing device performing or supporting another device to perform a process of inputting the test data into the obfuscation network, which is trained to support augmentation, to thereby allow the obfuscation network to obfuscate the test data by using the learned parameters of the obfuscation network and thus to output obfuscated test data, wherein, at the step of (a), upon acquiring an obfuscated training data score, as the second error, corresponding to the obfuscated training data inputted into a discriminator capable of determining whether its inputted data is real or fake or the augmented obfuscated training data inputted into the discriminator, the learning device has performed or supported another device to perform a process of training the obfuscation network such that the first error is minimized and the second error is maximized and a process of training the discriminator such that a training data score, corresponding to the modified training data inputted into the discriminator or the modified obfuscated training data inputted into the discriminator, is maximized and such that the obfuscated training data score is minimized, wherein, at the step of (a), the learning network includes a first learning network to an n-th learning network respectively having one or more first learned parameters to one or more n-th learned parameters wherein n is an integer greater than 1, and wherein the learning device has performed or supported another device to perform (i) a process of inputting the augmented obfuscated training data into each of the first learning network to the n-th learning network, to thereby allow each of the first learning network to the n-th learning network to (i-1) apply its corresponding learning operation to the augmented obfuscated training data by using respectively the first learned parameters to the n-th learned parameters of the first learning network to the n-th learning network, and thus (i-2) output each piece of (1_1)-st characteristic information for training to (1_n)-th characteristic information for training on the augmented obfuscated training data, (ii)

a process of inputting the training data into each of the first learning network to the n-th learning network, to thereby allow each of the first learning network to the n-th learning network to (ii-1) apply its corresponding learning operation to the training data by using respectively the first learned parameters to the n-th learned parameters, and thus (ii-2) output each piece of (2_1)-st characteristic information for training to (2_n)-th characteristic information for training on the training data, and (iii) a process of training the obfuscation network such that the first error is minimized which is an average over (iii-1) the (1_1)-st error acquired by referring to the (1_1)-st characteristic information for training and the (2_1)-st characteristic information for training to (iii-2) the (1_n)-th error acquired by referring to the (1_n)-th characteristic information for training and the (2_n)-th characteristic information for training and such that the second error which is the obfuscated training data score, corresponding to the obfuscated training data inputted into the discriminator or the augmented obfuscated training data inputted into the discriminator, is maximized and (iv) a process of training the discriminator such that the training data score, corresponding to the modified training data inputted into the discriminator or the modified obfuscated training data inputted into the discriminator, is maximized and such that the obfuscated training data score is minimized.

14. A learning device for training an obfuscation network to be used for obfuscating original data to protect personal information, comprising:
at least one memory that stores instructions; and
at least one processor configured to execute the instructions to perform or support another device to perform:
(I) if training data is acquired, (i) a process of inputting the training data into an obfuscation network, to thereby allow the obfuscation network to obfuscate the training data and thus to generate obfuscated training data and (ii) a process of inputting the obfuscated training data into an augmentation network, to thereby allow the augmentation network to augment the obfuscated training data and thus to generate augmented obfuscated training data, (II) (i) a process of inputting the augmented obfuscated training data into a learning network having one or more learned parameters, to thereby allow the learning network to (i-1) apply a learning operation to the augmented obfuscated training data by using the learned parameters and thus (i-2) generate first characteristic information for training corresponding to the augmented obfuscated training data and (ii) a process of inputting the training data into the learning network, to thereby allow the learning network to (ii-1) apply the learning operation to the training data by using the learned parameters and thus (ii-2) generate second characteristic information for training corresponding to the training data, and (III) a process of training the obfuscation network such that (i) at least one first error, calculated by referring to the first characteristic information for training and the second characteristic information for training, is minimized and (ii) at least one second error, calculated by referring to (ii-1) (ii-1-a) modified training data, created by modifying the training data, or modified obfuscated training data, created by modifying the obfuscated training data, and (ii-1-b) the obfuscated training data or (ii-2) (ii-2-a) the modified training data or the modified obfuscated training data and (ii-2-b) the augmented obfuscated training data, is maximized,
wherein the learning network includes a 1st learning network to an n-th learning network respectively having one or more 1st learned parameters to one or more n-th learned parameters wherein n is an integer greater than 1,
wherein, at the process of (II), the processor performs or supports another device to perform (i) a process of inputting the augmented obfuscated training data into each of the first learning network to the n-th learning network, to thereby allow each of the first learning network to the n-th learning network to (i-1) apply its corresponding learning operation to the augmented obfuscated training data by using respectively the first learned parameters to the n-th learned parameters of the first learning network to the n-th learning network, and thus (i-2) output each piece of (1_1)-st characteristic information for training to (1 n)-th characteristic information for training on the augmented obfuscated training data and (ii) a process of inputting the training data into each of the first learning network to the n-th learning network, to thereby allow each of the first learning network to the n-th learning network to (ii-1) apply its corresponding learning operation to the training data by using respectively the first learned parameters to the n-th learned parameters, and thus (ii-2) output each piece of (2_1)-st characteristic information for training to (2_n)-th characteristic information for training on the training data, and
wherein, at the process of (III), the processor performs or supports another device to perform a process of training the obfuscation network such that the first error, which is an average over (1) a (1_1)-st error calculated by referring to the (1_1)-st characteristic information for training and the (2_1)-st characteristic information for training to (2) a (I n)-th error calculated by referring to the (1 n)-th characteristic information for training and the (2 n)-th characteristic information for training, is minimized and such that the second error is maximized.

15. The learning device of claim 14, wherein, at the process of (III), on condition that an obfuscated training data score, corresponding to the obfuscated training data inputted into a discriminator capable of determining whether its inputted data is real or fake or the augmented obfuscated training data inputted into the discriminator, has been acquired as the second error, the processor performs or supports another device to perform a process of training the obfuscation network such that the first error is minimized and the second error is maximized and a process of training the discriminator such that a training data score, corresponding to the modified training data inputted into the discriminator or the modified obfuscated training data inputted into the discriminator, is maximized and such that the obfuscated training data score is minimized.

16. The learning device of claim 15, wherein a maximum of the training data score, corresponding to the modified training data inputted into the discriminator or the modified obfuscated training data inputted into the discriminator, is 1 as a value for determining the modified training data or the modified obfuscated training data as real and wherein a minimum of the obfuscated training data score, corresponding to the obfuscated training data inputted into the discriminator or the augmented obfuscated training data inputted into the discriminator, is 0 as a value for determining the obfuscated training data or the augmented obfuscated training data as fake.

17. The learning device of claim 14, wherein, at the process of (III), the processor performs or supports another device to perform a process of calculating the first error by referring to a difference between the first characteristic information for training and the second characteristic information for training and a process of calculating the second error by referring to (1) a difference between (1-a) the modified training data or the modified obfuscated training data and (1-b) the obfuscated training data or (2) a difference between (2-a) the modified training data or the modified obfuscated training data and (2-b) the augmented obfuscated training data.

18. The learning device of claim 17, wherein the processor performs or supports another device to perform a process of acquiring the first error by referring to a norm or a cosine similarity between the first characteristic information for training and the second characteristic information for training.

19. The learning device of claim 14, wherein, at the process of (III), the processor performs or supports another device to perform a process of calculating the first error by further referring to at least one class loss which is calculated by referring to (1) each of probabilities that each piece of the first characteristic information for training, each piece of which is mapped onto each class, belongs to its corresponding class and (2) a ground truth corresponding to the training data.

20. The learning device of claim 14, wherein, at the process of (III), the processor performs or supports another device to perform a process of measuring at least one quality by referring to at least part of an entropy of the augmented obfuscated training data and a degree of noise of the augmented obfuscated training data and a process of acquiring the first error by further referring to the measured quality.

21. A learning device for training an obfuscation network to be used for obfuscating original data to protect personal information, comprising:
at least one memory that stores instructions; and
at least one processor configured to execute the instructions to perform or support another device to perform: (I) if training data is acquired, (i) a process of inputting the training data into an obfuscation network, to thereby allow the obfuscation network to obfuscate the training data and thus to generate obfuscated training data and (ii) a process of inputting the obfuscated training data into an augmentation network, to thereby allow the augmentation network to augment the obfuscated training data and thus to generate augmented obfuscated training data, (II) (i) a process of inputting the augmented obfuscated training data into a learning network having one or more learned parameters, to thereby allow the learning network to (i-1) apply a learning operation to the augmented obfuscated training data by using the learned parameters and thus (i-2) generate first characteristic information for training corresponding to the augmented obfuscated training data and (ii) a process of inputting the training data into the learning network, to thereby allow the learning network to (ii-1) apply the learning operation to the training data by using the learned parameters and thus (ii-2) generate second characteristic information for training corresponding to the training data, and (III) a process of training the obfuscation network such that (i) at least one first error, calculated by referring to the first characteristic information for training and the second characteristic information for training, is minimized and (ii) at least one second error, calculated by referring to (ii-1) (ii-1-a) modified training data, created by modifying the training data, or modified obfuscated training data, created by modifying the obfuscated training data, and (ii-1-b) the obfuscated training data or (ii-2) (ii-2-a) the modified training data or the modified obfuscated training data and (ii-2-b) the augmented obfuscated training data, is maximized,
wherein the learning network includes a first learning network to an n-th learning network respectively having one or more first learned parameters to one or more n-th learned parameters wherein n is an integer greater than 2,
wherein, at the process of (I), the processor performs or supports another device to perform (i) a process of inputting the training data into the obfuscation network, to thereby allow the obfuscation network to obfuscate the training data and thus to generate first obfuscated training data and (ii) a process of inputting the first obfuscated training data into the augmentation network, to thereby allow the augmentation network to augment the first obfuscated training data and thus to generate first augmented obfuscated training data,
wherein, at the process of (II), the processor performs or supports another device to perform (i) a process of inputting the first augmented obfuscated training data into the first learning network, to thereby allow the first learning network to (i-1) apply the learning operation to the first augmented obfuscated training data by using the first learned parameters of the first learning network and thus (i-2) output (1_1)-st characteristic information for training on the first augmented obfuscated training data and (ii) a process of inputting the training data into the first learning network, to thereby allow the first learning network to (ii-1) apply the learning operation to the training data by using the first learned parameters and thus (ii-2) output (2_1)-st characteristic information for training on the training data,
wherein, at the process of (III), the processor performs or supports another device to perform a process of training the obfuscation network such that (i) at least one (1_1)-st error, calculated by referring to the (1_1)-st characteristic information for training and the (2_1)-st characteristic information for training, is minimized and (ii) at least one (2_1)-st error, calculated by referring to (ii-1) (ii-1-a) the modified training data or first modified obfuscated training data created by modifying the first obfuscated training data and (ii-1-b) the first obfuscated training data or (ii-2) (ii-2-a) the modified training data or the first modified obfuscated training data and (ii-2-b) the first augmented obfuscated training data, is maximized, to thereby allow the obfuscation network to be a first trained obfuscation network, and
wherein, while increasing an integer k from 2 to n, the processor performs or supports another device to perform (i) a process of inputting the training data into the (k−1)-th trained obfuscation network, to thereby allow the (k−1)-th trained obfuscation network to obfuscate the training data and thus to generate k-th obfuscated training data and a process of inputting the k-th obfuscated training data into the augmentation network, to thereby allow the augmentation network to augment the k-th obfuscated training data and thus to generate k-th augmented obfuscated training data, (ii) (ii-1) a process of inputting the k-th augmented obfuscated training data into a k-th learning network, to thereby allow the k-th learning network to apply the learning operation to the k-th augmented obfuscated training data by using one or more k-th learned parameters of the k-th learning network and thus to output (1_k)-th characteristic information for training on the k-th augmented obfuscated training data and (ii-2) a process of inputting the training data into the k-th learning network, to thereby allow the k-th learning network to apply the learning operation to the training data by using the k-th learned parameters and thus to output (2_k)-th characteristic information for training on the training data, and (iii) a process of training the (k−1)-th trained obfuscation network such that at least one (1_k)-th error, calculated by referring to the (1_k)-th characteristic information for training and the (2_k)-th characteristic information for training, is minimized and such that at least one (2_k)-th error, which is calculated by referring to (iii-1) (iii-1-a) the modified training data or k-th modified obfuscated training data calculated by modifying the k-th obfuscated training data and (iii-1-b) the k-th obfuscated training data or (iii-2) (iii-2-a) the modified training data or the k-th modified obfuscated training data and (iii-2-b) the k-th augmented obfuscated training data, is maximized, to thereby allow the (k−1)-th trained obfuscation network to be a k-th trained obfuscation network.

22. A learning device for training an obfuscation network to be used for obfuscating original data to protect personal information, comprising:
at least one memory that stores instructions; and
at least one processor configured to execute the instructions to perform or support another device to perform: (I) if training data is acquired, (i) a process of inputting the training data into an obfuscation network, to thereby allow the obfuscation network to obfuscate the training data and thus to generate obfuscated training data and (ii) a process of inputting the obfuscated training data into an augmentation network, to thereby allow the augmentation network to augment the obfuscated training data and thus to generate augmented obfuscated training data, (II) (i) a process of inputting the augmented obfuscated training data into a learning network having one or more learned parameters, to thereby allow the learning network to (i-1) apply a learning operation to the augmented obfuscated training data by using the learned parameters and thus (i-2) generate first characteristic information for training corresponding to the augmented obfuscated training data and (ii) a process of inputting the training data into the learning network, to thereby allow the learning network to (ii-1) apply the learning operation to the training data by using the learned parameters and thus (ii-2) generate second characteristic information for training corresponding to the training data, and (III) a process of training the obfuscation network such that (i) at least one first error, calculated by referring to the first characteristic information for training and the second characteristic information for training, is minimized and (ii) at least one second error, calculated by referring to (ii-1) (ii-1-a) modified training data, created by modifying the training data, or modified obfuscated training data, created by modifying the obfuscated training data, and (ii-1-b) the obfuscated training data or (ii-2) (ii-2-a) the modified training data or the modified obfuscated training data and (ii-2-b) the augmented obfuscated training data, is maximized,
wherein, at the process of (III), on condition that an obfuscated training data score, corresponding to the obfuscated training data inputted into a discriminator capable of determining whether its inputted data is real or fake or the augmented obfuscated training data inputted into the discriminator, has been acquired as the second error, the processor performs or supports another device to perform a process of training the obfuscation network such that the first error is minimized and the second error is maximized and a process of training the discriminator such that a training data score, corresponding to the modified training data inputted into the discriminator or the modified obfuscated training data inputted into the discriminator, is maximized and such that the obfuscated training data score is minimized, wherein the learning network includes a first learning network to an n-th learning network respectively having one or more first learned parameters to one or more n-th learned parameters wherein n is an integer greater than 1, wherein, at the process of (II), the processor performs or supports another device to
perform (i) a process of inputting the augmented obfuscated training data into each of the first learning network to the n-th learning network, to thereby allow each of the first learning network to the n-th learning network to (i-1) apply its corresponding learning operation to the augmented obfuscated training data by using respectively the first learned parameters to the n-th learned parameters of the first learning network to the n-th learning network, and thus (i-2) output each piece of (1_1)-st characteristic information for training to (1_n)-th characteristic information for training on the augmented obfuscated training data and (ii) a process of inputting the training data into each of the first learning network to the n-th learning network, to thereby allow each of the first learning network to the n-th learning network to (ii-1) apply its corresponding learning operation to the training data by using respectively the first learned parameters to the n-th learned parameters, and thus (ii-2) output each piece of (2_1)-st characteristic information for training to (2_n)-th characteristic information for training on the training data, and
wherein, at the process of (III), the processor performs or supports another device to perform (i) a process of training the obfuscation network such that the first error, which is an average over (i-1) at least one (1_1)-st error calculated by referring to the (1_1)-st characteristic information for training and the (2_1)-st characteristic information for training to (i-2) at least one (1_n)-th error calculated by referring to the (1_n)-th characteristic information for training and the (2_n)-th characteristic information for training, is minimized and such that the second error, which is the obfuscated training data score, corresponding to the obfuscated training data inputted into the discriminator or the augmented obfuscated training data inputted into the discriminator, is maximized and (ii) a process of training the discriminator such that the training data score, corresponding to the modified training data inputted into the discriminator or the modified obfuscated training data inputted into the discriminator, is maximized and such that the obfuscated training data score is minimized.

23. A learning device for training an obfuscation network to be used for obfuscating original data to protect personal information, comprising:
at least one memory that stores instructions; and at least one processor configured to execute the instructions to perform or support another device to perform:
(I) if training data is acquired, (i) a process of inputting the training data into an obfuscation network, to thereby allow the obfuscation network to obfuscate the training data and thus to generate obfuscated training data and (ii) a process of inputting the obfuscated training data into an augmentation network, to thereby allow the augmentation network to augment the obfuscated training data and thus to generate augmented obfuscated training data, (II) (i) a process of inputting the augmented obfuscated training data into a learning network having one or more learned parameters, to thereby allow the learning network to (i-1) apply a learning operation to the augmented obfuscated training data by using the learned parameters and thus (i-2) generate first characteristic information for training corresponding to the augmented obfuscated training data and (ii) a process of inputting the training data into the learning network, to thereby allow the learning network to (ii-1) apply the learning operation to the training data by using the learned parameters and thus (ii-2) generate second characteristic information for training corresponding to the training data, and (III) a process of training the obfuscation network such that (i) at least one first error, calculated by referring to the first characteristic information for training and the second characteristic information for training, is minimized and (ii) at least one second error, calculated by referring to (ii-1) (ii-1-a) modified training data, created by modifying the training data, or modified obfuscated training data, created by modifying the obfuscated training data, and (ii-1-b) the obfuscated training data or (ii-2) (ii-2-a) the modified training data or the modified obfuscated training data and (ii-2-b) the augmented obfuscated training data, is maximized, wherein, at the process of (III), on condition that an obfuscated training data score, corresponding to the obfuscated training data inputted into a discriminator capable of determining whether its inputted data is real or fake or the augmented obfuscated training data inputted into the discriminator, has been acquired as the second error, the processor performs or supports another device to perform a process of training the obfuscation network such that the first error is minimized and the second error is maximized and a process of training the discriminator such that a training data score, corresponding to the modified training data inputted into the discriminator or the modified obfuscated training data inputted into the discriminator, is maximized and such that the obfuscated training data score is minimized, wherein the learning network includes a first learning network to an n-th learning network respectively having one or more first learned parameters to one or more n-th learned parameters wherein n is an integer greater than 2, wherein, at the process of (I), the processor performs or supports another device to perform (i) a process of inputting the training data into the obfuscation network, to thereby allow the obfuscation network to obfuscate the training data and thus to generate first obfuscated training data and (ii) a process of inputting the first obfuscated training data into the augmentation network, to thereby allow the augmentation network to augment the first obfuscated training data and thus to generate first augmented obfuscated training data, wherein, at the process of (II), the processor performs or supports another device to perform (i) a process of inputting the first augmented obfuscated training data into the first learning network, to thereby allow the first learning network to (i-1) apply the learning operation to the first augmented obfuscated training data by using the first learned parameters of the first learning network and thus (i-2) output (1_1)-st characteristic information for training on the first augmented obfuscated training data and (ii) a process of inputting the training data into the first learning network, to thereby allow the first learning network to (ii-1) apply the learning operation to the training data by using the first learned parameters and thus (ii-2) output (2_1)-st characteristic information for training on the training data, wherein, at the process of (III), the processor performs or supports another device to perform (i) a process of training the obfuscation network such that at least one (1_1)-st error, calculated by referring to the (1_1)-st characteristic information for training and the (2_1)-st characteristic information for training, is minimized and such that at least one (2_1)-st error, which is a first obfuscated training data score, corresponding to the first obfuscated training data inputted into the discriminator or the first augmented obfuscated training data inputted into the discriminator, is maximized, to thereby allow the obfuscation network to be a first trained obfuscation network and (ii) a process of training the discriminator such that a first training data score, corresponding to the modified training data inputted into the discriminator or first modified obfuscated training data inputted into the discriminator, is maximized and such that the first obfuscated training data score is minimized, to thereby allow the discriminator to be a first trained discriminator, wherein the first modified obfuscated training data is created by modifying the first obfuscated training data and wherein, while increasing an integer k from 2 to n, the processor performs or supports another device to perform (i) a process of inputting the training data into the (k−1)-th trained obfuscation network, to thereby allow the (k−1)-th trained obfuscation network to obfuscate the training data and thus to generate k-th obfuscated training data and a process of inputting the k-th obfuscated training data into the augmentation network, to thereby allow the augmentation network to augment the k-th obfuscated training data and thus to generate k-th augmented obfuscated training data, (ii) (ii-1) a process of inputting the k-th augmented obfuscated training data into a k-th learning network, to thereby allow the k-th learning network to apply the learning operation to the k-th augmented obfuscated training data by using one or more k-th learned parameters of the k-th learning network and thus to output (1_k)-th characteristic information for training on the k-th augmented obfuscated training data and (ii-2) a process of inputting the training data into the k-th learning network, to thereby allow the k-th learning network to apply the learning operation to the training data by using the k-th learned parameters and thus to output (2_k)-th characteristic information for training on the training data, and (iii) (iii-1) a process of training the (k−1)-th trained obfuscation network such that at least one (1_k)-th error, calculated by referring to the (1_k)-th characteristic information for training and the (2_k)-th characteristic information for training, is minimized and such that at least one (2_k)-th error, which is a k-th obfuscated training data score, corresponding to the k-th obfuscated training data inputted into a (k−1)-th trained discriminator or the k-th augmented obfuscated training data inputted into the (k−1)-th trained discriminator, is maximized, to thereby allow the (k−1)-th trained obfuscation network to be a k-th trained obfuscation network and (iii-2) a process of training the (k−1)-th trained discriminator such that a k-th training data score, corresponding to the modified training data inputted into the (k−1)-th trained discriminator or k-th modified obfuscated training data inputted into the (k−1)-th trained discriminator, is maximized and such that the k-th obfuscated training data is minimized, to thereby allow the (k−1)-th trained discriminator to be a k-th trained discriminator, wherein the k-th modified obfuscated training data is created by modifying the k-th obfuscated training data.

24. A testing device for testing an obfuscation network to be used for obfuscating original data to protect personal information, comprising:
at least one memory that stores instructions; and
at least one processor configured to execute the instructions to perform or support another device to perform:
(I) on condition that the learning device has performed or supported another device to perform (i) a process of inputting training data into an obfuscation network, to thereby allow the obfuscation network to obfuscate the training data and thus to generate obfuscated training data and a process of inputting the obfuscated training data into an augmentation network, to thereby allow the augmentation network to augment the obfuscated training data and thus to generate augmented obfuscated training data, (ii) (ii-1) a process of inputting the augmented obfuscated training data into a learning network having one or more learned parameters, to thereby allow the learning network to apply a learning operation to the augmented obfuscated training data by using the learned parameters and thus to output first characteristic information for training on the augmented obfuscated training data and (ii-2) a process of inputting the training data into the learning network, to thereby allow the learning network to apply the learning operation to the training data by using the learned parameters and thus to output second characteristic information for training on the training data, and (iii) a process of training the obfuscation network such that at least one first error, calculated by referring to the first characteristic information for training and the second characteristic information for training, is minimized and such that at least one second error, which is calculated by referring to (iii-1) (iii-1-a) modified training data, created by modifying the training data, or modified obfuscated training data, created by modifying the obfuscated training data, and (iii-1-b) the obfuscated training data or (iii-2) (iii-2-a) the modified training data or the modified obfuscated training data and (iii-2-b) the augmented obfuscated training data, is maximized, process of acquiring test data, and (II) a process of inputting the test data into the obfuscation network, which is trained to support augmentation, to thereby allow the obfuscation network to obfuscate the test data by using the learned parameters of the obfuscation network and thus to output obfuscated test data, wherein, at the process of (I), the learning network includes a first learning network to an n-th learning network respectively having one or more first parameters to one or more n-th learned parameters wherein n is an integer greater than 1, and
wherein the learning device has performed or supported another device to perform (i) a process of inputting the augmented obfuscated training data into each of the first learning network to the n-th learning network, to thereby allow each of the first learning network to the n-th learning network to (i-1) apply its corresponding learning operation to the augmented obfuscated training data by using respectively the first learned parameters to the n-th learned parameters of the first learning network to the n-th learning network, and thus (i-2) output each piece of (1_1)-st characteristic information for training to (1_n)-th characteristic information for training on the augmented obfuscated training data, (ii) a process of inputting the training data into each of the first learning network to the n-th learning network, to thereby allow each of the first learning network to the n-th learning network to (ii-1) apply its corresponding learning operation to the training data by using respectively the first learned parameters to the n-th learned parameters, and thus (ii-2) output each piece of (2_1)-st characteristic information for training to (2_n)-th characteristic information for training on the training data, and (iii) a process of training the obfuscation network such that the first error is minimized which is an average over (iii-1) the (1_1)-st error acquired by referring to the (1_1)-st characteristic information for training and the (2_1)-st characteristic information for training to (iii-2) the (1_n)-th error acquired by referring to the (1_n)-th characteristic information for training and the (2_n)-th characteristic information for training and such that the second error is maximized which is calculated by referring to (iii-3) (iii-3-a) the modified training data or the modified obfuscated training data and (iii-3-b) the obfuscated training data or (iii-4) (iii-4-a) the modified training data or the modified obfuscated training data and (iii-4-b) the augmented obfuscated training data.

25. The testing device of claim 24, wherein, at the process of (I), upon acquiring an obfuscated training data score, as the second error, corresponding to the obfuscated training data inputted into a discriminator capable of determining whether its inputted data is real or fake or the augmented obfuscated training data inputted into the discriminator, the learning device has performed or supported another device to perform a process of training the obfuscation network such that the first error is minimized and the second error is maximized and a process of training the discriminator such that a training data score, corresponding to the modified training data inputted into the discriminator or the modified obfuscated training data inputted into the discriminator, is maximized and such that the obfuscated training data score is minimized.

26. A testing device for testing an obfuscation network to be used for obfuscating original data to protect personal information, comprising:
at least one memory that stores instructions; and
at least one processor configured to execute the instructions to perform or support another device to perform:
(I) on condition that the learning device has performed or supported another device to perform (i) a process of inputting training data into an obfuscation network, to thereby allow the obfuscation network to obfuscate the training data and thus to generate obfuscated training data and a process of inputting the obfuscated training data into an augmentation network, to thereby allow the augmentation network to augment the obfuscated training data and thus to generate augmented obfuscated training data, (ii) (ii-1) a process of inputting the augmented obfuscated training data into a learning network having one or more learned parameters, to thereby allow the learning network to apply a learning operation to the augmented obfuscated training data by using the learned parameters and thus to output first characteristic information for training on the augmented obfuscated training data and (ii-2) a process of inputting the training data into the learning network, to thereby allow the learning network to apply the learning operation to the training data by using the learned parameters and thus to output second characteristic information for training on the training data, and (iii) a process of training the obfuscation network such that at least one first error, calculated by referring to the first characteristic information for training and the second characteristic information for training, is minimized and such that at least one second error, which is calculated by referring to (iii-1) (iii-1-a) modified training data, created by modifying the training data, or modified obfuscated training data, created by modifying the obfuscated training data, and (iii-1-b) the obfuscated training data or (iii-2) (iii-2-a) the modified training data or the modified obfuscated training data and (iii-2-b) the augmented obfuscated training data, is maximized, process of acquiring test data, and (II) a process of inputting the test data into the obfuscation network, which is trained to support augmentation, to thereby allow the obfuscation network to obfuscate the test data by using the learned parameters of the obfuscation network and thus to output obfuscated test data, wherein, at the process of (I), upon acquiring an obfuscated training data score, as the second error, corresponding to the obfuscated training data inputted into a discriminator capable of determining whether its inputted data is real or fake or the augmented obfuscated training data inputted into the discriminator, the learning device has performed or supported another device to perform a process of training the obfuscation network such that the first error is minimized and the second error is maximized and a process of training the discriminator such that a training data score, corresponding to the modified training data inputted into the discriminator or the modified obfuscated training data inputted into the discriminator, is maximized and such that the obfuscated training data score is minimized, wherein, at the process of (I), the learning network includes a first learning network to an n-th learning network respectively having one or more first learned parameters to one or more n-th learned parameters wherein n is an integer greater than 1, and wherein the learning device has performed or supported another device to perform (i) a process of inputting the augmented obfuscated training data into each of the first learning network to the n-th learning network, to thereby allow each of the first learning network to the n-th learning network to (i-1) apply its corresponding learning operation to the augmented obfuscated training data by using respectively the first learned parameters to the n-th learned parameters of the first learning network to the n-th learning network, and thus (i-2) output each piece of (1_1)-st characteristic information for training to (1_n)-th characteristic information for training on the augmented obfuscated training data, (ii) a process of inputting the training data into each of the first learning network to the n-th learning network, to thereby allow each of the first learning network to the n-th learning network to (ii-1) apply its corresponding learning operation to the training data by using respectively the first learned parameters to the n-th learned parameters, and thus (ii-2) output each piece of (2_1)-st characteristic information for training to (2_n)-th characteristic information for training on the training data, and (iii) a process of training the obfuscation network such that the first error is minimized which is an average over (iii-1) the (1_1)-st error acquired by referring to the (1_1)-st characteristic information for training and the (2_1)-st characteristic information for training to (iii-2) the (1_n)-th error acquired by referring to the (1_n)-th characteristic information for training and the (2_n)-th characteristic information for training and such that the second error which is the obfuscated training data score, corresponding to the obfuscated training data inputted into the discriminator or the augmented obfuscated training data inputted into the discriminator, is maximized and (iv) a process of training the discriminator such that the training data score, corresponding to the modified training data inputted into the discriminator or the modified obfuscated training data inputted into the discriminator, is maximized and such that the obfuscated training data score is minimized.

* * * * *